US011182567B2

(12) United States Patent
Furukawa et al.

(10) Patent No.: US 11,182,567 B2
(45) Date of Patent: Nov. 23, 2021

(54) SPEECH TRANSLATION APPARATUS, SPEECH TRANSLATION METHOD, AND RECORDING MEDIUM STORING THE SPEECH TRANSLATION METHOD

(71) Applicant: Panasonic Corporation, Osaka (JP)

(72) Inventors: Hiroki Furukawa, Osaka (JP); Tsuyoki Nishikawa, Osaka (JP); Atsushi Sakaguchi, Kyoto (JP); Kohhei Hayashida, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 309 days.

(21) Appl. No.: 16/364,811

(22) Filed: Mar. 26, 2019

(65) Prior Publication Data

US 2019/0303443 A1 Oct. 3, 2019

Related U.S. Application Data

(60) Provisional application No. 62/649,904, filed on Mar. 29, 2018.

(30) Foreign Application Priority Data

Dec. 7, 2018 (JP) .............................. JP2018-230066

(51) Int. Cl.
*G06F 40/58* (2020.01)
*G01S 3/802* (2006.01)
(Continued)

(52) U.S. Cl.
CPC .............. *G06F 40/58* (2020.01); *G01S 3/802* (2013.01); *G06F 40/103* (2020.01); *G10L 15/26* (2013.01)

(58) Field of Classification Search
CPC ........ G06F 40/58; G06F 40/103; G01S 3/802; G10L 15/26
(Continued)

(56) References Cited

U.S. PATENT DOCUMENTS 9,721,587 B2 * 8/2017 Klein ...................... G10L 21/10
2003/0097250 A1 * 5/2003 Chino ................. G06F 3/04883
704/1

(Continued)

FOREIGN PATENT DOCUMENTS

JP 2003-295892 10/2003
JP 3891023 3/2007

*Primary Examiner* — Edwin S Leland, III
(74) *Attorney, Agent, or Firm* — Wenderoth, Lind & Ponack, L.L.P.

(57) ABSTRACT

A speech translation apparatus includes: an estimator which estimates a sound source direction, based on an acoustic signal obtained by a microphone array unit; a controller which identifies that an utterer is a user or a conversation partner, based on the sound source direction estimated after the start of translation is instructed by a button, using a positional relationship indicated by a layout information item stored in storage and selected in advance, and determines a translation direction indicating input and output languages in and into which content of the acoustic signal is recognized and translated, respectively; and a translator which obtains, according to the translation direction, original text indicating the content in the input language and translated text indicating the content in the output language. The controller displays the original and translated texts on first and second display areas corresponding to the positions of the user and conversation partner, respectively.

13 Claims, 23 Drawing Sheets

(51) Int. Cl.
  *G06F 40/103* (2020.01)
  *G10L 15/26* (2006.01)

(58) Field of Classification Search
  USPC .............................................................. 704/2
  See application file for complete search history.

(56) References Cited

U.S. PATENT DOCUMENTS

| | | | |
|---|---|---|---|
| 2009/0055178 A1* | 2/2009 | Coon | G10L 17/00 704/246 |
| 2009/0111507 A1* | 4/2009 | Chen | H04M 1/6008 455/550.1 |
| 2011/0044438 A1* | 2/2011 | Wang | G10L 15/26 379/93.02 |
| 2012/0035907 A1* | 2/2012 | Lebeau | G10L 13/00 704/2 |
| 2012/0089392 A1* | 4/2012 | Larco | G10L 15/063 704/231 |
| 2012/0310622 A1* | 12/2012 | Zivkovic | G06F 40/58 704/3 |
| 2013/0216050 A1* | 8/2013 | Chen | H04M 9/082 381/56 |
| 2013/0238312 A1* | 9/2013 | Waibel | G10L 15/1815 704/8 |
| 2013/0253900 A1* | 9/2013 | Escobedo | G06F 40/58 704/2 |
| 2015/0154957 A1* | 6/2015 | Nakadai | G06F 40/58 704/235 |
| 2015/0154960 A1* | 6/2015 | Ai | H04L 12/1827 704/246 |
| 2015/0256873 A1* | 9/2015 | Klein | H04N 21/4383 725/39 |
| 2015/0363757 A1* | 12/2015 | Mocko | G06Q 20/209 705/16 |
| 2016/0012827 A1* | 1/2016 | Alves | H04R 3/005 381/71.1 |
| 2017/0060828 A1* | 3/2017 | Rainisto | H04L 12/1831 |
| 2018/0286433 A1* | 10/2018 | Hicks | G10L 21/0232 |
| 2019/0095430 A1* | 3/2019 | Smus | G06F 40/58 |
| 2019/0130931 A1* | 5/2019 | Costa | G10L 21/10 |
| 2019/0147870 A1* | 5/2019 | Taki | G10L 25/84 704/233 |
| 2019/0303443 A1* | 10/2019 | Furukawa | G06F 40/103 |
| 2019/0304442 A1* | 10/2019 | Hayashida | G10L 15/20 |

\* cited by examiner

SECOND LANGUAGE SIDE
(CONVERSATION PARTNER)

FIRST LANGUAGE SIDE
(USER)

FIRST LANGUAGE SIDE    SECOND LANGUAGE SIDE
     (USER)            (CONVERSATION PARTNER)

SECOND LANGUAGE SIDE     FIRST LANGUAGE SIDE
(CONVERSATION PARTNER)        (USER)

SECOND LANGUAGE SIDE
(CONVERSATION PARTNER)

FIRST LANGUAGE SIDE
(USER)

SECOND LANGUAGE SIDE
(CONVERSATION PARTNER)

FIRST LANGUAGE SIDE
(USER)

SPEECH TRANSLATION APPARATUS, SPEECH TRANSLATION METHOD, AND RECORDING MEDIUM STORING THE SPEECH TRANSLATION METHOD

CROSS REFERENCE TO RELATED APPLICATION

This application claims the benefit of priority of U.S. Patent Application No. 62/649,904 filed on Mar. 29, 2018 and the benefit of priority of Japanese Patent Application Number 2018-230066 filed on Dec. 7, 2018, the entire contents of which are hereby incorporated by reference.

BACKGROUND

1. Technical Field

The present disclosure relates to a speech translation apparatus, a speech translation method, and a recording medium.

2. Description of the Related Art

For example, patent literature 1 (Japanese Patent Publication Number 3891023) discloses a technique for recognizing a language of utterances of a user and a language of utterances of a conversation partner, and translating each of the utterances of one of the languages into an utterance of the other language.

SUMMARY

The technique disclosed in patent literature 1, however, entails a problem that the user and the conversation partner need to take the trouble of performing a button operation before making each utterance.

The present disclosure was made in view of such circumstances, and has an object to provide a speech translation apparatus, a speech translation method, and a recording program for enabling increase in operability.

A speech translation apparatus according to an aspect of the present disclosure is a speech translation apparatus including: a translation start button which instructs start of translation when operated by one of a user of the speech translation apparatus and a conversation partner of the user; a sound source direction estimator which estimates a sound source direction by processing an acoustic signal obtained by a microphone array unit; a controller which (i) identifies that an utterer who utters speech is one of the user and the conversation partner, based on the sound source direction estimated by the sound source direction estimator after the start of the translation is instructed by the translation start button, using a positional relationship indicated by a layout information item selected in advance from a plurality of layout information items that are stored in storage and respectively indicate different positional relationships between the user, the conversation partner, and a display, and (ii) determines a translation direction indicating an input language in which content of the acoustic signal is recognized and an output language into which the content of the acoustic signal is translated, the input language being one of a first language and a second language and the output language being the other one of the first language and the second language; a translator which obtains, according to the translation direction determined by the controller, (i) original text indicating the content of the acoustic signal obtained by causing a recognition processor to recognize the acoustic signal in the input language and (ii) translated text indicating the content of the acoustic signal obtained by causing a translation processor to translate the original text into the output language; and a display unit which displays the original text on a first area of the display, and displays the translated text on a second area of the display, the first area corresponding to a position of the identified one of the user and the conversation partner, the second area corresponding to a position of the other one of the user and the conversation partner.

It is to be noted that some specific aspects among these aspects may be implemented using a system, a method, an integrated circuit, a computer program, or a computer-readable recording medium such as a CD-ROM, or any combination of systems, methods, integrated circuits, computer programs, and recording media.

According to the present disclosure, it is possible to implement speech translation apparatus, etc. capable of increasing operability.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
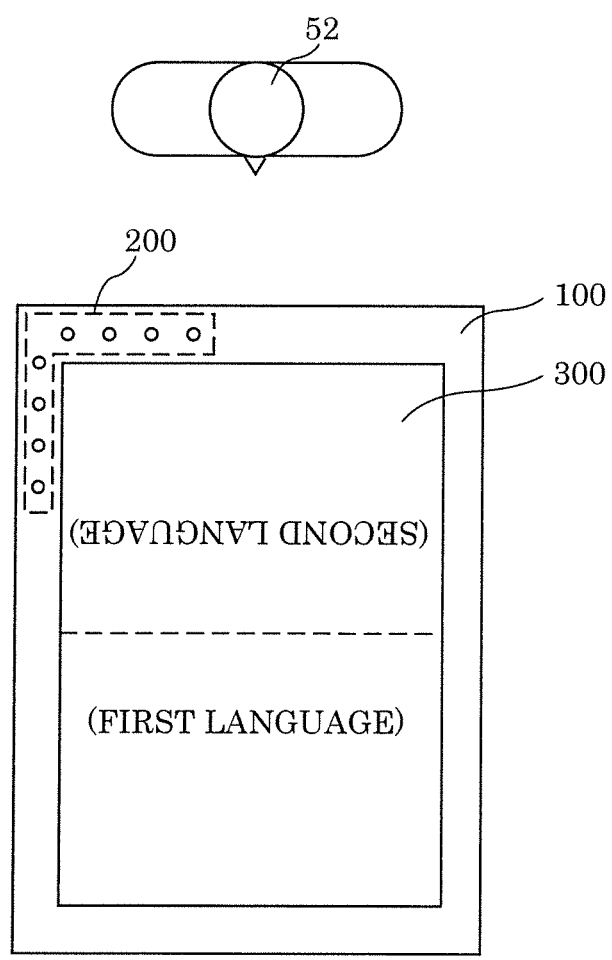
FIG. 1 is a diagram illustrating an appearance of a speech translation apparatus according to Embodiment 1 and a use scene example thereof.

A speech translation apparatus according to an aspect of the present disclosure is a speech translation apparatus including: a translation start button which instructs start of translation when operated by one of a user of the speech translation apparatus and a conversation partner of the user; a sound source direction estimator which estimates a sound source direction by processing an acoustic signal obtained by a microphone array unit; a controller which (i) identifies that an utterer who utters speech is one of the user and the conversation partner, based on the sound source direction estimated by the sound source direction estimator after the start of the translation is instructed by the translation start button, using a positional relationship indicated by a layout information item selected in advance from a plurality of layout information items that are stored in storage and respectively indicate different positional relationships between the user, the conversation partner, and a display, and (ii) determines a translation direction indicating an input language in which content of the acoustic signal is recognized and an output language into which the content of the acoustic signal is translated, the input language being one of a first language and a second language and the output language being the other one of the first language and the second language; a translator which obtains, according to the translation direction determined by the controller, (i) original text indicating the content of the acoustic signal obtained by causing a recognition processor to recognize the acoustic signal in the input language and (ii) translated text indicating the content of the acoustic signal obtained by causing a translation processor to translate the original text into the output language; and a display unit which displays the original text on a first area of the display, and displays the translated text on a second area of the display, the first area corresponding to a position of the identified one of the user and the conversation partner, the second area corresponding to a position of the other one of the user and the conversation partner.

With this configuration, once the translation start button is pressed when starting the translation, the speech translation apparatus automatically switches between the input language and the output language according to utterances of the user and the conversation partner without requiring a button operation each time when an utterance is started in a conversation between the user and the conversation partner. In this way, operability can be increased. Since the input language and the output language are automatically switched according to each utterance in the conversation between the user and the conversation partner, the user and the conversation partner can continue the conversation without being stopped to perform button operations, and thus can make the conversation through the speech translation apparatus more naturally.

Here, for example, the translator may include the recognition processor and the translation processor.

With this configuration, the user and the conversation partner can make the conversation through the speech translation apparatus more naturally even in an environment in which communication is impossible or unstable.

In addition, for example, the translator may be connectable to a server via a network, and the server may include at least one of the recognition processor and the translation processor.

With this configuration, the speech translation apparatus having a reduced size and weight can be implemented. Furthermore, with this configuration, the speech translation apparatus can use the recognition processor and the translation processor in the server of a cloud in which recognition performances of the recognition processor and translation performances of the translation processor are gradually increased, and thus can recognize the content of utterances between the user and the conversation partner more accurately and translate the recognized content more accurately. Thus, the user and the conversation partner can make the conversation through the speech translation apparatus more naturally.

In addition, for example, the speech translation apparatus may further include: a delay unit which delays the acoustic signal obtained by the microphone array unit for a certain period of time; and a beam former which forms a beam which is an acoustic signal having a controlled sound receiving directivity in a predetermined direction by processing the acoustic signal delayed by the delay unit, wherein the beam former may form the beam in the sound source direction estimated by the sound source direction estimator to be the predetermined direction.

With this configuration, the speech translation apparatus is capable of directing a beam to the user or the conversation partner, and thus is capable of receiving utterances of the user and the conversation partner while reducing surrounding noise. In this way, the speech translation apparatus can be used even in an environment in which noise level is high.

In addition, for example, the speech translation apparatus may further include: a speaker, wherein the translator may obtain translated speech data obtained by causing a text synthesis processor to convert the translated text into speech data of the output language, and transfer the translated speech data to the speaker, and the speaker may output speech of the translated text according to the translated speech data transferred.

In this way, each of the user and the conversation partner does not take the trouble of reading characters indicating the content of the utterance by the other one in the conversation, which further increases the operability of the speech translation apparatus. Since the user and the conversation partner can make conversation using only speech in this way, the user and the conversation partner can make the conversation via the speech translation apparatus more naturally.

In addition, for example, the display may be card shaped, and when the layout information item indicates a positional relationship in which the user and the conversation partner face each other across the display, the display unit may display the original text and the translated text in the first area and the second area, respectively, in such a manner that characters of the original text are oriented toward the identified one of the user and the conversation partner and characters of the translated text are oriented toward the other one of the user and the conversation partner. In addition, the display may be card shaped, and when the layout information item indicates a display-centered positional relationship in which the user is present at a first side of the display and the conversation partner is present at a second side of the display which is different from and perpendicular to the first side, the display unit may display the original text and the translated text in the first area and the second area, respectively, in such a manner that characters of the translated text are oriented toward the other one of the user and the conversation partner in a direction rotated by 90 degrees from a direction of the characters of the original text oriented toward the identified one of the user and the conversation partner.

In this way, the speech translation apparatus is capable of displaying the characters toward the user and the conversation partner in an easy to read manner. Thus, the user and the conversation partner can make the conversation through the speech translation apparatus more naturally.

In addition, for example, the display may be card shaped, and the plurality of layout information items may include: (i) a positional relationship in which the user and the conversation partner face each other across the display; (ii) a positional relationship in which the user and the conversation partner are present side by side at one of sides of the display either in this order or an inverse order; and (iii) a display-centered positional relationship in which the user is present at the first side of the display and the conversation partner is present at the second side of the display which is different from and perpendicular to the first side.

In this way, the speech translation apparatus is capable of displaying the characters of the utterances toward the user and the conversation partner in an easy to read manner. Thus, the user and the conversation partner can make the conversation through the speech translation apparatus more naturally.

In addition, for example, the speech translation apparatus may further include: a speech determiner which determines whether the acoustic signal obtained by the microphone array unit includes speech, wherein the controller may determine the translation direction only when (i) the acoustic signal is determined to include speech by the speech determiner and (ii) the sound source direction estimated by the sound source direction estimator indicates the position of the user or the position of the conversation partner in the positional relationship indicated by the layout information item.

With this configuration, the speech translation apparatus is capable of avoiding or reducing erroneous detections in which nonsteady noise is recognized as speech and detecting only the utterance of the user or the conversation partner. Thus, since erroneous operations due to noise can be avoided or reduced, the user and the conversation partner can make the conversation through the speech translation apparatus more naturally.

In addition, for example, the speech translation apparatus may further include: a layout selection controller which (i) initializes the layout information item selected in advance when the start of the translation is instructed by the translation start button operated by the user, and (ii) selects one of the plurality of layout information items stored in the storage as the layout information item, based on a result of the determination made by the speech determiner and a result of the estimation performed by the sound source direction estimator.

In this way, the speech translation apparatus is capable of displaying characters indicating the content of utterances in right orientations according to the positions of the user and the conversation partner even when the positional relationship between the user and the conversation partner is different from a previously set positional relationship. Thus, the speech translation apparatus is capable of displaying the characters for the user and the conversation partner in an easy to read manner.

Here, for example, the layout selection controller: after initializing the layout information item selected in advance, estimates, to be the direction in which the user is present, the sound source direction first estimated by the sound source direction estimator when the acoustic signal is determined to include speech by the speech determiner; after estimating the direction in which the user is present, when (i) the acoustic signal is determined to include speech and (ii) the sound source direction estimated by the sound source direction estimator is a direction different from the direction in which the user is present, determines the different direction to be the direction in which the conversation partner is present; and selects one of the plurality of layout information items as the layout information item, based on the direction in which the user is present and the direction in which the conversation partner is present.

In addition, a speech translation method according to the present disclosure is a speech translation method performed by a speech translation apparatus including a translation start button which instructs start of translation when operated by one of a user of the speech translation apparatus and a conversation partner of the user, the speech translation method further including: estimating a sound source direction by processing an acoustic signal obtained by a microphone array unit; (i) identifying that an utterer who utters speech is one of the user and the conversation partner of the user, based on the sound source direction estimated by the sound source direction estimator after the start of the translation is instructed by the translation start button, using a positional relationship indicated by a layout information item selected in advance from a plurality of layout information items that are stored in storage and respectively indicate different positional relationships between the user, the conversation partner, and a display, and (ii) determining a translation direction indicating an input language in which content of the acoustic signal is recognized and an output language into which the content of the acoustic signal is translated, the input language being one of a first language and a second language and the output language being the other one of the first language and the second language; obtaining, according to the translation direction determined in the determining, (i) original text indicating the content of the acoustic signal obtained by causing a recognition processor to recognize the acoustic signal in the input language and (ii) translated text indicating the content of the acoustic signal obtained by causing a translation processor to translate the original text into the output language; and displaying the original text on a first area of the display, and displaying the translated text on a second area of the display, the first area corresponding to a position of the identified one of the user and the conversation partner, the second area corresponding to a position of the other one of the user and the conversation partner.

In this way, once the translation start button is pressed when starting the translation, the speech translation apparatus automatically switches between the input language and the output language according to utterances of the user and the conversation partner without performing a button operation each time when an utterance is started in the conversation between the user and the conversation partner. In this way, operability can be increased. Since the input language and the output language are automatically switched according to each utterance in the conversation between the user and the conversation partner, the user and the conversation partner can continue the conversation without being stopped to perform button operations, and thus can make the conversation through the speech translation apparatus more naturally.

In addition, a recording medium according to the present disclosure is a non-transitory computer-readable recording medium having a program stored thereon for causing a speech translation apparatus to execute a speech translation method, the speech translation apparatus including a translation start button which instructs start of translation when operated by one of a user of the speech translation apparatus and a conversation partner of the user, the speech translation method including: estimating a sound source direction by processing an acoustic signal obtained by a microphone array unit; (i) identifying that an utterer who utters speech is one of the user and the conversation partner of the user, based on the sound source direction estimated by the sound source direction estimator after the start of the translation is instructed by the translation start button, using a positional relationship indicated by a layout information item selected in advance from a plurality of layout information items that are stored in storage and respectively indicate different positional relationships between the user, the conversation partner, and a display, and (ii) determining a translation direction indicating an input language in which content of the acoustic signal is recognized and an output language into which the content of the acoustic signal is translated, the input language being one of a first language and a second language and the output language being the other one of the first language and the second language; obtaining, according to the translation direction determined in the determining, (i) original text indicating the content of the acoustic signal obtained by causing a recognition processor to recognize the acoustic signal in the input language and (ii) translated text indicating the content of the acoustic signal obtained by causing a translation processor to translate the original text into the output language; and displaying the original text on a first area of the display, and displaying the translated text on a second area of the display, the first area corresponding to a position of the identified one of the user and the conversation partner, the second area corresponding to a position of the other one of the user and the conversation partner.

In this way, once the translation start button is pressed when starting the translation, the speech translation apparatus automatically switches between the input language and the output language according to utterances of the user and the conversation partner without performing a button operation each time when an utterance is started in the conversation between the user and the conversation partner. In this way, operability can be increased. Since the input language and the output language are automatically switched according to each utterance in the conversation between the user and the conversation partner, the user and the conversation partner can continue the conversation without being stopped to perform button operations, and thus can make the conversation through the speech translation apparatus more naturally.

It is to be noted that some specific aspects among these aspects may be implemented using a system, a method, an integrated circuit, a computer program, or a computer-readable recording medium such as a CD-ROM, or any combination of systems, methods, integrated circuits, computer programs, and recording media.

Hereinafter, a speech translation apparatus according to an aspect of the present disclosure is described specifically with reference to the drawings. It is to be noted that each of the exemplary embodiments described below indicates a specific example. The numerical values, shapes, materials, constituent elements, the arrangement of the constituent elements, etc. indicated in the following embodiments are mere examples, and thus do not limit the present disclosure. Among the constituent elements in the following embodiments, constituent elements not recited in any one of the independent claims that define the most generic concept are described as optional constituent elements. The constituent elements may be combined in any of the embodiments.

Embodiment 1

<Outline>

FIG. 1 is a diagram illustrating the appearance of speech translation apparatus 100 according to Embodiment 1 and a use scene example thereof.

Speech translation apparatus 100 is an apparatus which translates bi-directionally conversation between user 51 who utters in a first language and conversation partner 52 who utters in a second language. In other words, speech translation apparatus 100 is an apparatus which recognizes each of the languages of the utterances by user 51 and conversation partner 52 among the two different languages of the utterances by user 51 and conversation partner 52, and translates each utterance in one of the languages into an utterance in the other language. Speech translation apparatus 100 is configured to have an elongated shape such as a card for example, and is implemented as a mobile terminal such as a card-shaped terminal, a smartphone, and a tablet. As illustrated in FIG. 1, speech translation apparatus 100 includes: microphone array unit 200 including a microphone array of a plurality of microphones for receiving utterances; and display 300 which displays a result of translation as text. It is to be noted that display 300 is used in portrait orientation or in landscape orientation.

FIG. 1 illustrates an example in which user 51 who speaks the first language is present at a bottom side of speech translation apparatus 100 and conversation partner 52 who speaks the second language is present at a top side of speech translation apparatus 100, and user 51 and conversation partner 52 make face-to-face conversation using speech translation apparatus 100 in portrait orientation. In this embodiment, once a translation start button (not illustrated) is pressed to start translation, speech translation apparatus 100 automatically switches a language to be recognized (input language) and a language into which the input language is to be translated (output language) according to each utterance in conversation between user 51 and conversation partner 52.

<Apparatus Configuration>

Figure 2:
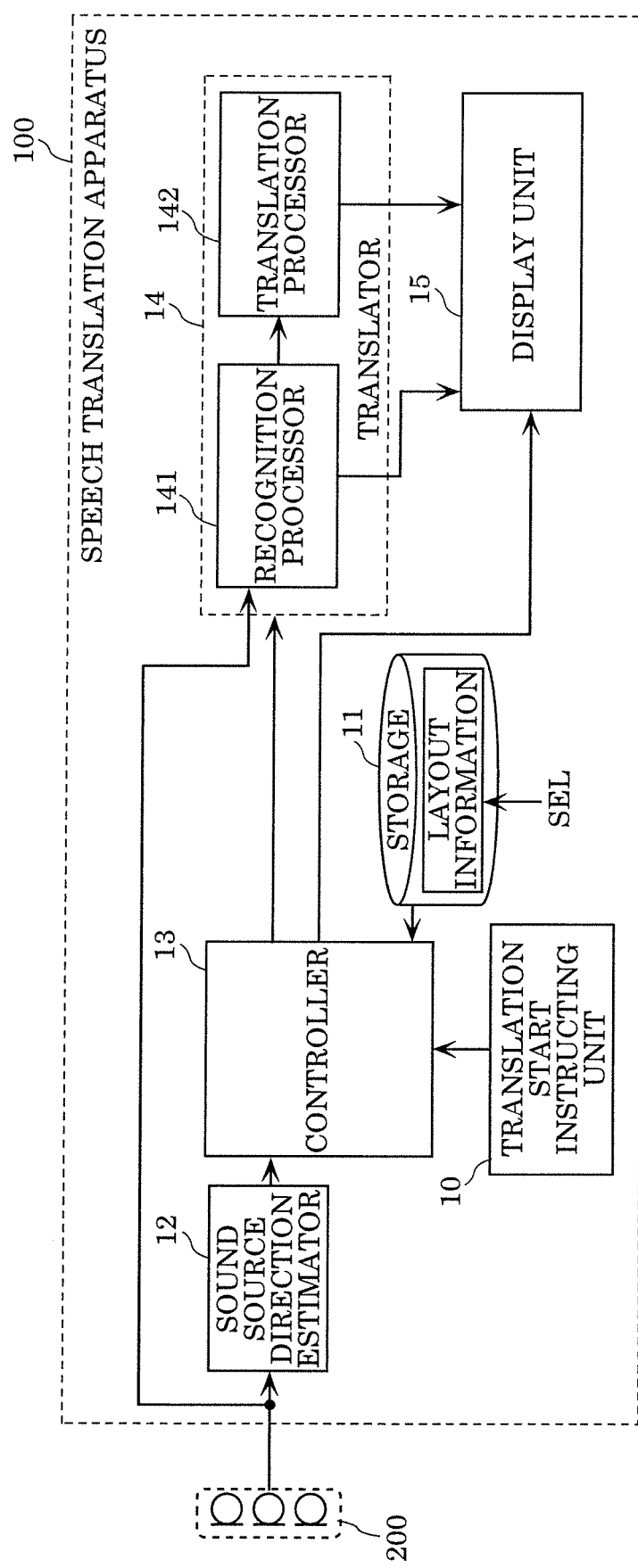
FIG. 2 is a diagram illustrating an example of a configuration of the speech translation apparatus according to Embodiment 1.

FIG. 2 is a diagram illustrating an example of a configuration of speech translation apparatus 100 according to Embodiment 1.

As illustrated in FIG. 2, speech translation apparatus 100 includes translation start instructing unit 10, storage 11, sound source direction estimator 12, controller 13, translator 14, and display unit 15. Speech translation apparatus 100 may further include microphone array unit 200. Stated differently, it is not essential for speech translation apparatus 100 to include microphone array unit 200.

[Microphone Array Unit 200]

Microphone array unit 200 obtains a speech signal. More specifically, microphone array unit 200 includes a microphone array of two or more microphone units arranged apart from each other, receives sound, and obtains an acoustic signal which is an electrical signal converted from the received sound. Microphone array unit 200 outputs the obtained acoustic signal to controller 13. It is to be noted that microphone array unit 200 may be configured as an adaptor. In this case, microphone array unit 200 is mounted on speech translation apparatus 100 so as to function.

It is to be noted that microphone array unit 200 needs to receive human speech in 360-degree directions surrounding or centering speech translation apparatus 100. It is only necessary for microphone array unit 200 to receive sounds in a frequency band ranging from 50 Hz to 7 kHz in order to receive human speech. For this reason, microphone array unit 200 may be configured with not a microphone array in which microphones are arranged one-dimensionally but a microphone array in which microphones are arranged two-dimensionally. In addition, the microphone array in which microphones are arranged two-dimensionally may be configured with a plurality of microphone units which are arranged apart from each other by a distance within a predetermined range.

Figure 3A:
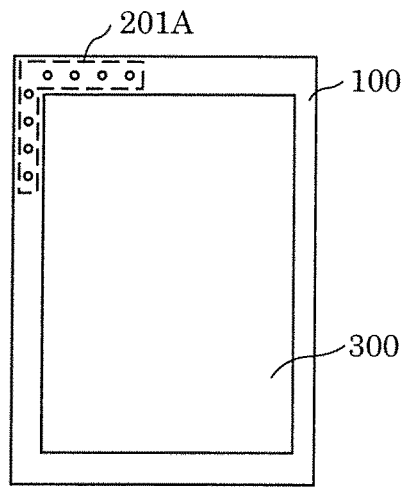
FIG. 3A is a diagram for illustrating a mounting example of a microphone array included in a microphone array unit according to Embodiment 1.
Figure 3B:
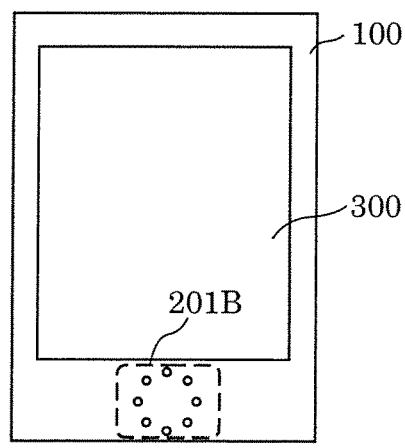
FIG. 3B is a diagram for illustrating a mounting example of a microphone array included in a microphone array unit according to Embodiment 1.
Figure 3C:
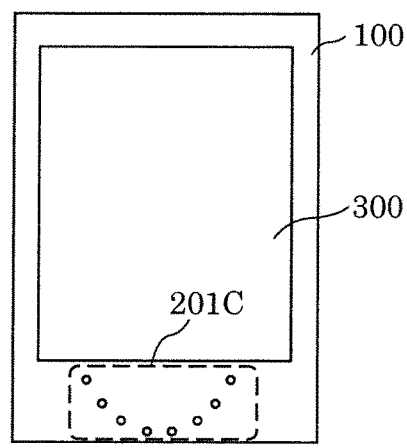
FIG. 3C is a diagram for illustrating a mounting example of a microphone array included in a microphone array unit according to Embodiment 1.

Each of FIGS. 3A to 3C is a diagram for illustrating a mounting example of a microphone array included in microphone array unit 200 according to Embodiment 1.

More specifically, in FIG. 3A, microphone array unit 200 may be configured with L-shaped microphone array 201A in which a plurality of microphone units are arranged in L-shape. In FIG. 3B, microphone array unit 200 may be configured with circle-shaped microphone array 201B in which a plurality of microphone units are arranged in circle shape. In FIG. 3C, microphone array unit 200 may be configured with arc-shaped microphone array 201C in which a plurality of microphone units are arranged in arc shape.

[Translation Start Instructing Unit 10]

Translation start instructing unit 10 instructs start of translation to speech translation apparatus 100, when operated by user 51 or conversation partner 52 of speech translation apparatus 100. In this embodiment, translation start instructing unit 10 is, for example, a translation start button. When the translation start button is operated by, for example, being pressed, translation start instructing unit 10 instructs start of translation to speech translation apparatus 100.

[Storage 11]

Storage 11 is configured with a hard disk drive (HDD), memory, or the like.

In this embodiment, storage 11 stores a plurality of layout information items respectively indicating different positional relationships of user 51, conversation partner 52, and display 300. In Storage 1, one layout information item is selected in advance from among the plurality of layout information items that are stored therein.

In addition, storage 11 stores a coordinate system centering speech translation apparatus 100 and indices assigned respectively to segment areas of a region centering speech translation apparatus 100.

Here, first, a description is given of a specific example of the plurality of layout information items according to this embodiment. Each of FIGS. 4A to 4E is a diagram illustrating an example of a layout information item stored in storage 11 according to Embodiment 1.

Figure 4A:
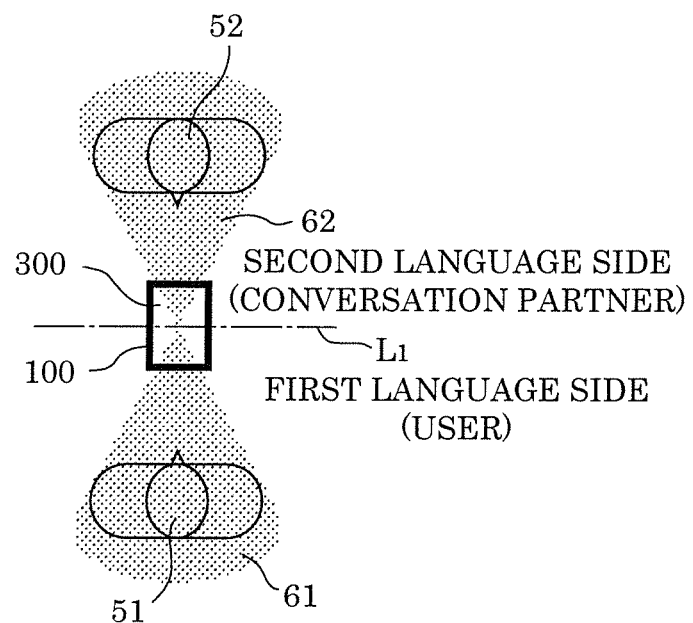
FIG. 4A is a diagram illustrating an example of a layout information item that is stored in a storage according to Embodiment 1.

The layout information item illustrated in FIG. 4A indicates a positional relationship in the case where speech translation apparatus 100 is used in portrait orientation by user 51 and conversation partner 52 facing each other. More specifically, the layout information item indicates the positional relationship in which user 51 who speaks the first language is present at the bottom side with respect to center line $L_1$ which divides display 300 into top and bottom areas, conversation partner 52 who speaks the second language is present at the top side with respect to center line $L_1$, and user 51 and conversation partner 52 face each other. Alternatively, the layout information item illustrated in FIG. 4A may indicate a positional relationship in which user 51 who speaks the first language is present in sound source direction 61 of the bottom side of speech translation apparatus 100 used in portrait orientation and conversation partner 52 who speaks the second language is present in sound source direction 62 of the top side of speech translation apparatus 100. In this way, FIG. 4A illustrates the layout information item indicating the positional relationship in which user 51 and conversation partner 52 face each other across display 300.

Figure 4B:
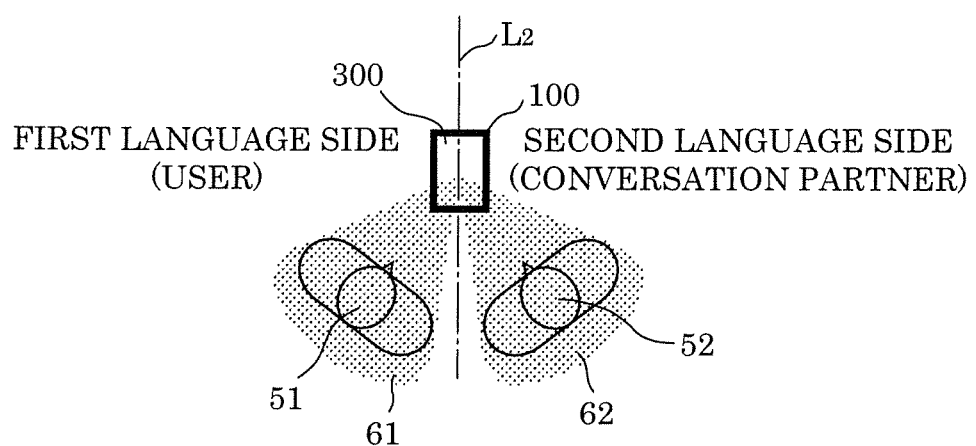
FIG. 4B is a diagram illustrating an example of a layout information item that is stored in the storage according to Embodiment 1.

The layout information item illustrated in FIG. 4B indicates a positional relationship in the case where speech translation apparatus 100 is used in portrait orientation when user 51 and conversation partner 52 are present side by side in such a manner that user 51 is present to the left of conversation partner 52. More specifically, the layout information item indicates the positional relationship in which user 51 who speaks the first language is present at the left side with respect to center line $L_2$ which divides display 300 into right and left areas, conversation partner 52 who speaks the second language is present at the right side with respect to center line $L_2$, and user 51 and conversation partner 52 are present side by side at the bottom side of speech translation apparatus 100. Alternatively, the layout information item illustrated in FIG. 4B may indicate a positional relationship in which user 51 who speaks the first language is present in sound source direction 61 on the lower left side of speech translation apparatus 100 used in portrait orientation and conversation partner 51 who speaks the second language is present in sound source direction 62 on the lower right side of speech translation apparatus 100. Likewise, the layout information item illustrated in FIG. 4C indicates a positional relationship in the case where speech translation apparatus 100 is used in portrait orientation when user 51 and conversation partner 52 are present side by side in such a manner that user 51 is present to the right of conversation partner 52. More specifically, the layout information item indicates the positional relationship in which user 51 who speaks the first language is present at the right side with respect to center line $L_2$ which divides display 300 into right and left areas, conversation partner 52 who speaks the second language is present at the left side with respect to center line $L_2$, and user 51 and conversation partner 52 are present side by side at the bottom side of speech translation apparatus 100. Alternatively, the layout information item illustrated in FIG. 4C may indicate a positional relationship in which user 51 who speaks the first language is present in sound source direction 61 on the lower right side of speech translation apparatus 100 used in portrait orientation and conversation partner 51 who speaks the second language is present in sound source direction 62 on the lower left side of speech translation apparatus 100. In this way, FIG. 4B and FIG. 4C each illustrates the layout information item indicating the positional relationship in which user 51 and conversation partner 52 are present side by side in this order or the inverse order at the one side of display 300.

Figure 4C:
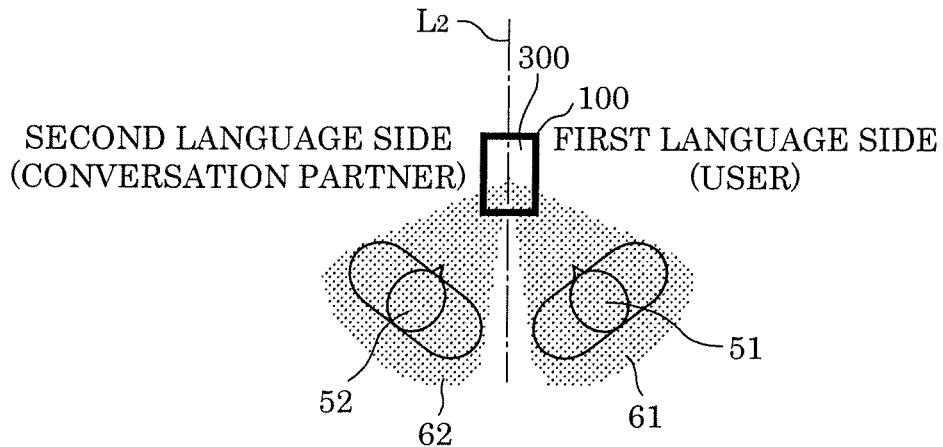
FIG. 4C is a diagram illustrating an example of a layout information item that is stored in the storage according to Embodiment 1.
Figure 4D:
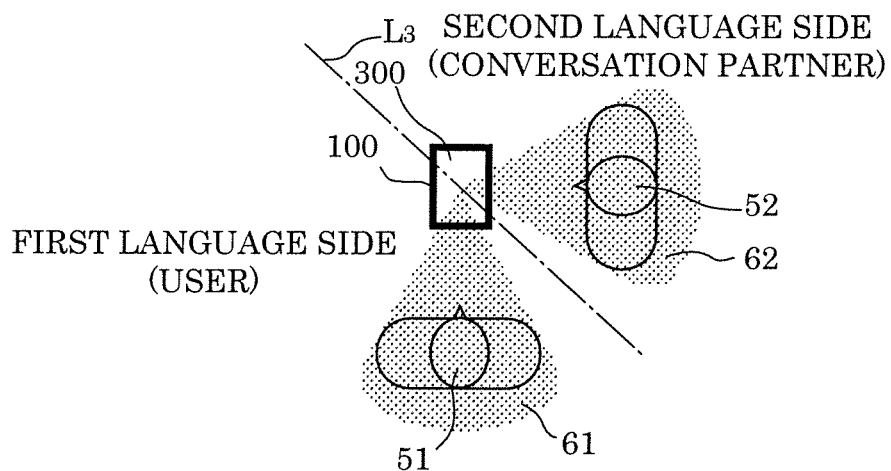
FIG. 4D is a diagram illustrating an example of a layout information item that is stored in the storage according to Embodiment 1.

The layout information item illustrated in FIG. 4D indicates a positional relationship in the case where speech translation apparatus 100 is used in portrait orientation when conversation partner 52 is present at the right angle position to the right of user 51. More specifically, the layout information item indicates the positional relationship in which user 51 is present at the lower left side with respect to left-to-right diagonal $L_3$ which divides display 300, that is, at the bottom side of speech translation apparatus 100, conversation partner 52 is present at the upper right side with respect to left-to-right diagonal $L_3$, that is, at the right side of speech translation apparatus 100, and user 51 and conversation partner 52 are present at right angle positions. Alternatively, the layout information item illustrated in FIG. 4D may indicate a positional relationship in which user 51 who speaks the first language is present in sound source direction 61 on the bottom side of speech translation apparatus 100 used in portrait orientation and conversation partner 51 who speaks the second language is present in sound source direction 62 which is the direction on the right side of speech translation apparatus 100. Likewise, the layout information item illustrated in FIG. 4E indicates a positional relationship in the case where speech translation apparatus 100 is used in portrait orientation when conversation partner 52 is present at the right angle position to the left of user 51. More specifically, the layout information item indicates the positional relationship in which user 51 is present at the lower right side with respect to right-to-left diagonal $L_4$ which divides display 300, that is, at the bottom side of speech translation apparatus 100, conversation partner 52 is present at the upper left side with respect to right-to-left diagonal $L_4$, that is, at the left side of speech translation apparatus 100, and user 51 and conversation partner 52 are present at right angle positions. Alternatively, the layout information item illustrated in FIG. 4E may indicate a positional relationship in which user 51 who speaks the first language is present in sound source direction 61 at the bottom side of speech translation apparatus 100 used in portrait orientation and conversation partner 51 who speaks the second language is present in sound source direction 62 which is the direction to the left of speech translation apparatus 100. In this way, FIG. 4D and FIG. 4E each illustrates the layout information item indicating the display 300 centered positional relationship in which user 51 is present at the first side of display 300, and conversation partner 52 is present at the second side of display 300 which is different from and perpendicular to the first side.

Next, descriptions are given of a coordinate system centering speech translation apparatus 100 according to this embodiment and indices assigned respectively to segment areas of a region centering speech translation apparatus 100.

Figure 5:
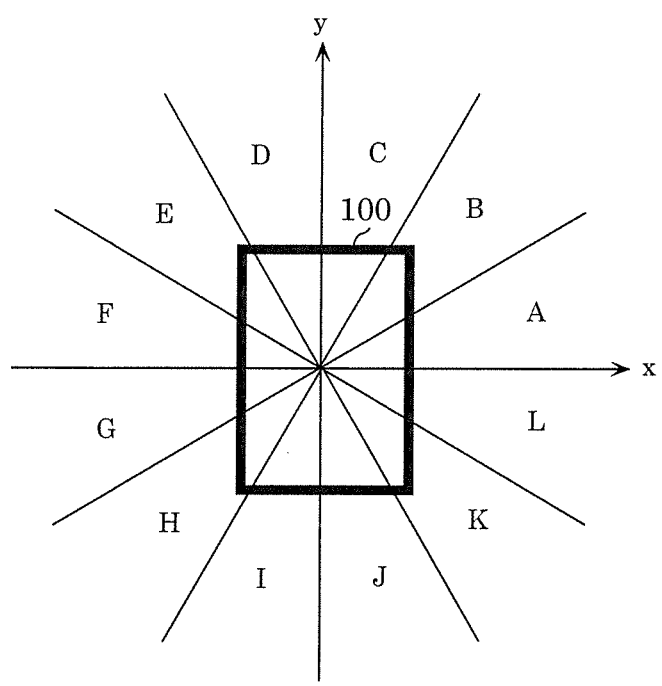
FIG. 5 is a diagram illustrating an example of a coordinate system, segment areas, and indices assigned respectively to the segment areas, all stored in the storage according to Embodiment 1.

FIG. 5 is a diagram illustrating an example of a coordinate system, segment areas, and indices assigned respectively to the segment areas stored in storage 11 according to Embodiment 1.

As illustrated in FIG. 5, the coordinate system stored in storage 11 is an xy coordinate system having the center of speech translation apparatus 100 as the origin on a plane approximately parallel to the plane of display 300. In addition, the segment areas stored in storage 11 are areas obtained by dividing the region represented on the plane of the xy coordinate system at a predetermined angle and respectively assigned with the indices. In short, storage 11 stores the indices assigned respectively to the segment areas together with the segment areas. The segment areas illustrated in FIG. 5 is of the region on the plane of the xy coordinate system divided at each 30 degrees. The segment areas illustrated in FIG. 5 are assigned with indices A to L counterclockwise starting with the segment area in contact with the x axis of a first quadrant.

It is to be noted that the predetermined angle is not always 30 degrees. The predetermined angle may be determined within a range from 30 degrees to 180 degrees suitably according to the granularity in the sound source direction which is desired to be estimated. For example, the predetermined angle may be 180 degrees when it is only necessary to estimate which one of the bottom side and the top side of speech translation apparatus 100 to be used in portrait orientation the sound source is present.

[Sound Source Direction Estimator 12]

Sound source direction estimator 12 estimates a sound source direction by processing an acoustic signal obtained by microphone array unit 200. More specifically, sound source direction estimator 12 estimates the sound source direction based on (i) the difference between sound arrival times at which a sound arrives at the respective microphone units of microphone array unit 200 and (ii) the coordinates and sound velocity of each of the microphone units.

[Controller 13]

Controller 13 is configured with a central processing unit (CPU), memory, etc. In this embodiment, when start of translation is instructed by translation start instructing unit 10, controller 13 controls translator 14 and display unit 15, based on a pre-selected layout information item stored in storage 11, etc. and the sound source direction estimated by sound source direction estimator 12. More specifically, controller 13 identifies that the utterer who uttered speech is one of user 51 and conversation partner 52, based on the sound source direction estimated by sound source direction estimator 12 after the start of translation is instructed by translation start instructing unit 10 using the positional relationship indicated by the pre-selected layout information item.

Here, a method for identifying either user 51 or conversation partner 52 is described. FIGS. 6A to 6E each indicate indices of segment areas in which user 51 and conversation partner 52 are present when speech translation apparatus 100 according to Embodiment 1 is used in portrait orientation.

Figure 6A:
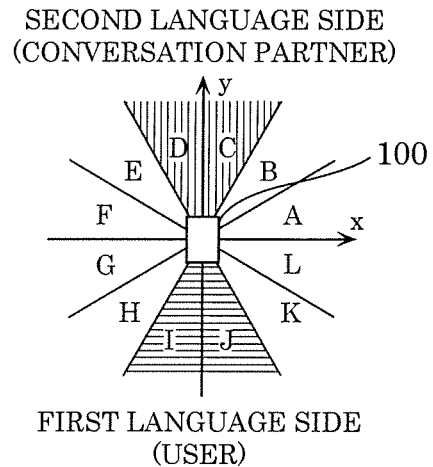
FIG. 6A is a diagram illustrating indices of segment areas in which the user and the conversation partner are present when the speech translation apparatus according to Embodiment 1 is used in portrait orientation.

FIG. 6A is a diagram indicating indices of segment areas in which user 51 and conversation partner 52 are present when the pre-selected layout information item indicates that speech translation apparatus 100 illustrated in FIG. 4A is used in portrait orientation when user 51 and conversation partner 52 are present face to face.

In other words, when the sound source direction estimated by sound source direction estimator 12 is indicated by index I or index J in FIG. 6A, controller 13 identifies that the utterer is user 51, based on the positional relationship indicated by the pre-selected layout information item illustrated in FIG. 4A. When the sound source direction estimated by sound source direction estimator 12 is indicated by index C or index D in FIG. 6A, controller 13 identifies that the utterer is user 52, based on the positional relationship indicated by the pre-selected layout information item illustrated in FIG. 4A.

Figure 6B:
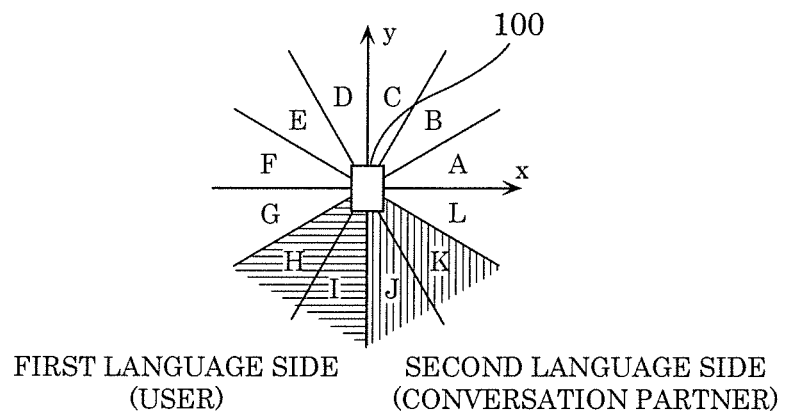
FIG. 6B is a diagram illustrating indices of segment areas in which the user and the conversation partner are present when the speech translation apparatus according to Embodiment 1 is used in portrait orientation.

FIG. 6B is a diagram indicating indices of segment areas in which user 51 and conversation partner 52 are present when the pre-selected layout information item indicates that speech translation apparatus 100 illustrated in FIG. 4B is used in portrait orientation when user 51 and conversation partner 52 are present side by side in such a manner that user 51 is present to the left of conversation partner 52. In other words, when the sound source direction estimated by sound source direction estimator 12 indicated by index H or index I in FIG. 6B, identifies that the utterer is user 51, based on the positional relationship indicated by the pre-selected layout information item illustrated in FIG. 4B. When the sound source direction estimated by sound source direction estimator 12 is indicated by index J or index K in FIG. 6B, controller 13 identifies that the utterer is user 52, based on the positional relationship indicated by the pre-selected layout information item illustrated in FIG. 4B.

Figure 6C:
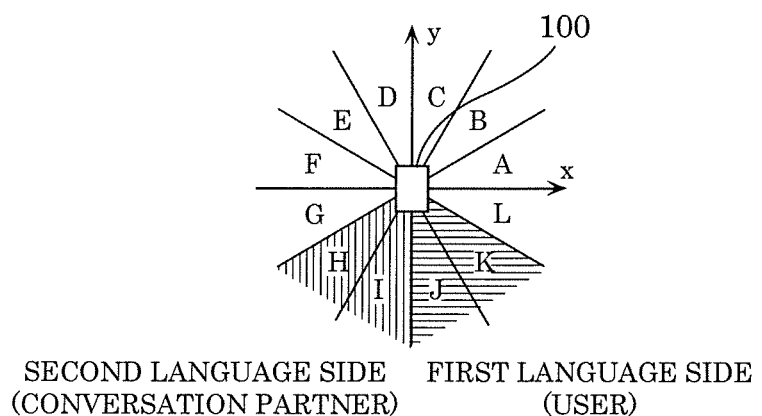
FIG. 6C is a diagram illustrating indices of segment areas in which the user and the conversation partner are present when the speech translation apparatus according to Embodiment 1 is used in portrait orientation.

FIG. 6C is a diagram indicating indices of segment areas in which user 51 and conversation partner 52 are present when the pre-selected layout information item indicates that speech translation apparatus 100 illustrated in FIG. 4C is used in portrait orientation when user 51 and conversation partner 52 are present side by side in such a manner that user 51 is present to the right of conversation partner 52.

In other words, when the sound source direction estimated by sound source direction estimator 12 is indicated by index J or index K in FIG. 6C, controller 13 identifies that the utterer is user 51, based on the positional relationship indicated by the pre-selected layout information item illustrated in FIG. 4C. When the sound source direction estimated by sound source direction estimator 12 is indicated by index H or index I in FIG. 6C, controller 13 identifies that the utterer is conversation partner 52, based on the positional relationship indicated by the pre-selected layout information item illustrated in FIG. 4B.

Figure 6D:
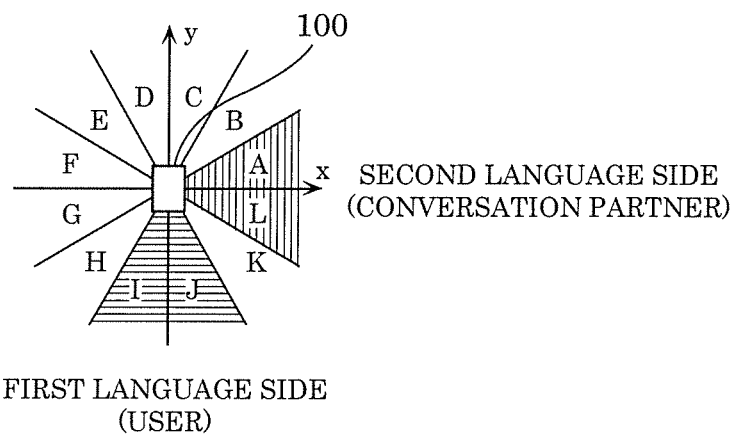
FIG. 6D is a diagram illustrating indices of segment areas in which the user and the conversation partner are present when the speech translation apparatus according to Embodiment 1 is used in portrait orientation.

FIG. 6D is a diagram indicating indices of segment areas in which user 51 and conversation partner 52 are present when the pre-selected layout information item indicates that speech translation apparatus 100 illustrated in FIG. 4D is used in portrait orientation when conversation partner 52 is present at the right angle position to the right of user 51.

In other words, when the sound source direction estimated by sound source direction estimator 12 is indicated by index I or index J in FIG. 6D, controller 13 identifies that the utterer is user 51, based on the positional relationship indicated by the pre-selected layout information item illustrated in FIG. 4D. When the sound source direction estimated by sound source direction estimator 12 is indicated by index A or index L in FIG. 6D, controller 13 identifies that the utterer is conversation partner 52, based on the positional relationship indicated by the pre-selected layout information item illustrated in FIG. 4D.

Figure 6E:
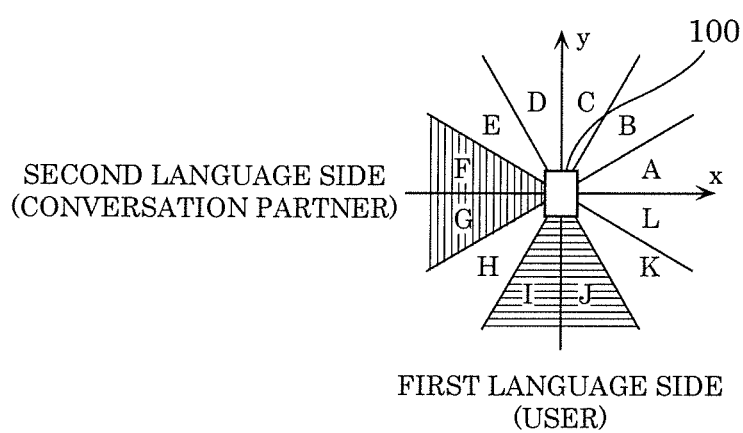
FIG. 6E is a diagram illustrating indices of segment areas in which the user and the conversation partner are present when the speech translation apparatus according to Embodiment 1 is used in portrait orientation.

FIG. 6E is a diagram indicating indices of segment areas in which user 51 and conversation partner 51 are present when the pre-selected layout information item indicates that speech translation apparatus 100 illustrated in FIG. 4D is used in portrait orientation when conversation partner 52 is present at the right angle position to the left of user 51.

Figure 4E:
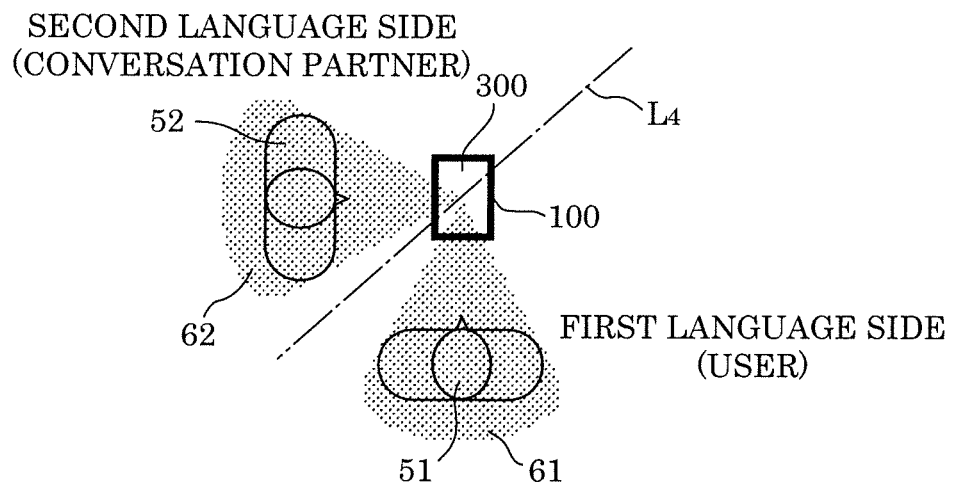
FIG. 4E is a diagram illustrating an example of a layout information item that is stored in the storage according to Embodiment 1.

In other words, when the sound source direction estimated by sound source direction estimator 12 is indicated by index I or index J in FIG. 6E, controller 13 identifies that the utterer is user 51, based on the positional relationship indicated by the pre-selected layout information item illustrated in FIG. 4E. When the sound source direction estimated by sound source direction estimator 12 is indicated by index F or index G in FIG. 6E, controller 13 identifies that the utterer is conversation partner 52, based on the positional relationship indicated by the pre-selected layout information item illustrated in FIG. 4E.

In addition, controller 13 determines a translation direction indicating an input language in which the content of the acoustic signal is recognized and an output language into which the content of the acoustic signal is translated.

More specifically, when user 51 is identified as the utterer, controller 13 determines the translation direction specifying the input language in which the content of the acoustic signal is recognized as the first language and the output language into which the content of the acoustic signal is to be translated as the second language. It is to be noted that controller 13 may determine a translation direction from the first language to the second language when user 51 is identified as the utterer. When conversation partner is identified as the utterer, controller 13 determines a translation direction specifying the input language as the second language and the output language as the first language. Controller 13 controls translator 14 according to the determined translation direction. It is to be noted that controller 13 may determine a translation direction from the second language to the first language when conversation partner 52 is identified as the utterer.

Furthermore, controller 13 causes display unit 15 to display characters in original text indicating the content of the acoustic signal in input language toward user 51 and characters in translated text indicating the same content in output language toward conversation partner 52, for easiness in reading. It is to be noted that controller 13 may transfer, to display unit 15, information indicating that the identified utterer is one of user 51 and conversation partner 52, information indicating the determined translation direction, and the pre-selected layout information item.

[Translator 14]

Translator 14 includes recognition processor 141 and translation processor 142 as illustrated in, for example, FIG. 2.

<Recognition Processor 141>

Recognition processor 141 recognizes content of an acoustic signal in input language which is one of the first language and the second language according to the translation direction determined by controller 13, and generates original text indicating the content of the acoustic signal. For example, when the translation direction determined by controller 13 specifies the recognized language as the first language and the translated language as the second language, recognition processor 141 recognizes the content of the acoustic signal in the first language and generates the text indicating the content of the acoustic signal in the first language. For example, when the translation direction determined by controller 13 specifies the recognized language as the second language and the translated language as the first language, recognition processor 141 recognizes the content of the acoustic signal in the second language and generates text indicating the content of the acoustic signal in the second language.

It is to be noted that recognition processor 141 may be included in a server such as a cloud without being included in translator 14. In this case, translator 14 is connectable to the server via a network, and thus it is only necessary for translator 14 to obtain original text indicating content of an acoustic signal obtained by causing recognition processor 141 to recognize the content of the acoustic signal in one of languages according to the translation direction determined by controller 13.

<Translation Processor 142>

Translation processor 142 translates the content of the acoustic signal in translated language which is the other one of the first language and the second language according to the translation direction determined by controller 13 to generate translated text indicating the content of the acoustic signal. For example, when the translation direction determined by controller 13 specifies the recognized language as the first language and the translated language as the second language, translation processor 142 translates the original text indicating the content of the acoustic signal recognized in the first language into the second language to generate translated text indicating the content of the acoustic signal in the second language. In addition, when the translation direction determined by controller 13 specifies the recognized language as the second language and the translated language as the first language, translation processor 142 translates the original text indicating the content of the acoustic signal recognized in the second language into the first language to generate the translated text indicating the content of the acoustic signal in the first language.

It is to be noted that translation processor 142 may be included in a server such as a cloud without being included in translator 14. In this case, translator 14 is connectable to the server via a network, and thus it is only necessary for translator 14 to obtain translated text indicating the content of the acoustic signal obtained by causing translation processor 142 to translate the original text indicating the content of the acoustic signal generated in one of languages into the other one of the languages according to the translation direction determined by controller 13.

In this way, translator 14 may include recognition processor 141 and translation processor 142, or at least one of recognition processor 141 and translation processor 142 may be included in a server such as a cloud. When at least one of recognition processor 141 and translation processor 142 is included in a server, translator 14 may connect to the at least one of recognition processor 141 and translation processor 142 through communication, or the like.

[Display Unit 15]

Display unit 15 determines a display screen layout and the orientation of characters to be displayed according to the positional relationship indicated by a pre-selected layout information item, and displays the original text and the translated text obtained by the translator 14. More specifically, display unit 15 displays the original text on a first area of display 300 and displays the translated text on a second area of display 300. The first area corresponds to the position of the identified one of user 51 and conversation partner 52, and the second area corresponds to the position of the other one of user 51 and conversation partner 52.

Here, a description is given of an example of a display 300 screen displayed by display unit 15. FIGS. 7A to 7D are each a diagram illustrating an example of a display 300 screen displayed when speech translation apparatus 100 according to Embodiment 1 is used in portrait orientation. Hereinafter, a description is given assuming that the first language is Japanese and the second language is English.

Figure 7A:
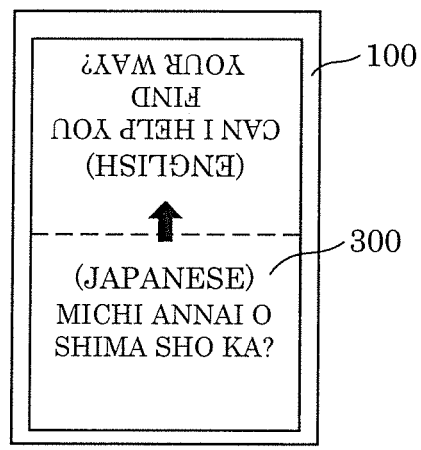
FIG. 7A is a diagram illustrating an example of a display screen displayed on a display when the speech translation apparatus according to Embodiment 1 is used in portrait orientation.

FIG. 7A illustrates an example of a display screen in the case where a recognized language is Japanese and a translated language is English when the pre-selected layout information item indicates that speech translation apparatus 100 illustrated in FIG. 4A is used in portrait orientation when user 51 and conversation partner 52 face each other. In FIG. 7A, Japanese text "Michi annai o shima sho ka?" is displayed in the bottom area of display 300, and translated English text "Can I help you find your way?" is displayed in the top area of display 300. Furthermore, in FIG. 7A, the characters of the translated English text are oriented opposite to characters of the Japanese text.

In other words, display unit 15 determines a display screen layout composed of a first language area and a second language area obtained by dividing the region of display 300 into top and bottom areas, based on the positional relationship indicated by a pre-selected layout information item as illustrated in FIG. 4A. Display unit 15 displays the Japanese text in the first language area and displays the characters of the translated English text in the second language area in such a manner that the characters of the translated English text are oriented opposite to the characters of the Japanese text. In this way, it is assumed that the pre-selected layout information item indicates the positional relationship in which user 51 and conversation partner 52 face each other across display 300. In this case, display unit 15 displays the original text and the translated text in the first display area and the second display area, respectively, in such a manner that the characters of the original text are oriented toward user 51 and the characters of the translated text are oriented toward conversation partner 52.

Figure 7B:
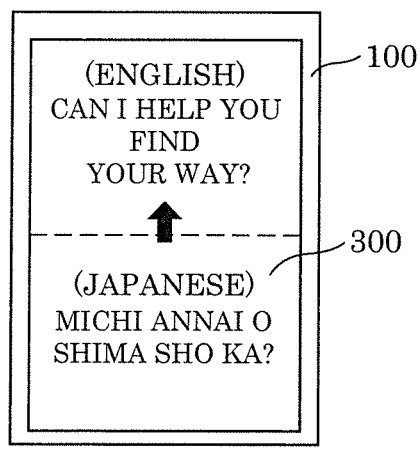
FIG. 7B is a diagram illustrating an example of a display screen displayed on the display when the speech translation apparatus according to Embodiment 1 is used in portrait orientation.

FIG. 7B illustrates an example of a display screen in the case where pre-selected layout information item indicates that a recognized language is Japanese and a translated language is English when the pre-selected layout information item indicates that speech translation apparatus 100 illustrated in FIGS. 4B and 4C is used in portrait orientation when user 51 and conversation partner 52 are present side by side. Also in FIG. 7B, Japanese text "Michi annai o shima sho ka?" is displayed in the bottom area of display 300, and translated English text "Can I help you find your way?" is displayed in the top area of display 300. Furthermore, in FIG. 7B, the characters of the translated English text are oriented in the same direction as the characters of the Japanese text.

In other words, display unit 15 determines a display screen layout composed of a first language area and a second language area obtained by dividing the region of display 300 into top and bottom areas, based on the positional relationship indicated by a pre-selected layout information item as illustrated in each of FIGS. 4B and 4C. Display unit 15 displays the Japanese text in the first language area and displays the characters of the translated English text in the second language area in such a manner that the characters of the translated English text are oriented in the same direction in which the characters of the Japanese text are oriented. In this way, it is assumed that the pre-selected layout information item indicates the positional relationship in which user 51 and conversation partner 52 are present side by side in this order or in the inverse order at the one side of display 300. In this case, display unit 15 displays the original text and the translated text in the first display area and the second display area, respectively, in such a manner that the characters of the original text and the characters of the translated text are oriented in the same direction.

Figure 7C:
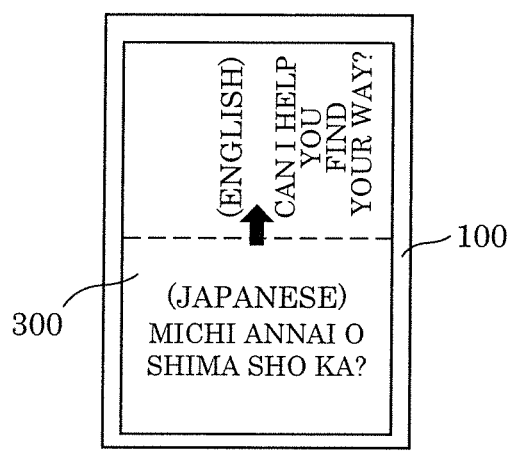
FIG. 7C is a diagram illustrating an example of a display screen displayed on the display when the speech translation apparatus according to Embodiment 1 is used in portrait orientation.

FIG. 7C illustrates an example in which a recognized language is Japanese and a translated language is English when the pre-selected layout information item indicates that speech translation apparatus 100 illustrated in FIG. 4D is used in portrait orientation when conversation partner 52 is present at the right angle position to the right of user 51. Also in FIG. 7C, Japanese text "Michi annai o shima sho ka?" is displayed in the bottom area of display 300, and translated English text "Can I help you find your way?" is displayed in the top area of display 300. Furthermore, in FIG. 7C, the characters of the translated English text are displayed in the direction rotated left by 90 degrees from the direction of the characters of the Japanese text.

In other words, display unit 15 determines a display screen layout composed of a first language area and a second language area obtained by dividing the region of display 300 into top and bottom areas, based on the positional relationship indicated by a pre-selected layout information item as illustrated in FIG. 4D. Display unit 15 displays the Japanese text in the first language area and displays the characters of the translated English text in the second language area in the direction rotated left by 90 degrees from the direction of the characters of the Japanese text.

Figure 7D:
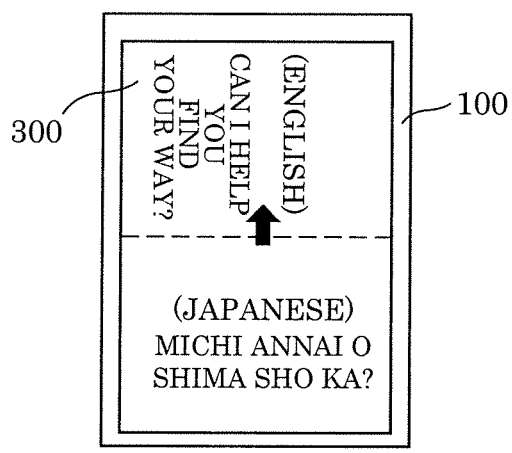
FIG. 7D is a diagram illustrating an example of a display screen displayed on the display when the speech translation apparatus according to Embodiment 1 is used in portrait orientation.

FIG. 7D illustrates an example in which a recognized language is Japanese and a translated language is English when the pre-selected layout information item indicates that speech translation apparatus 100 illustrated in FIG. 4E is used in portrait orientation when conversation partner 52 is present at the right angle position to the right of user 51. Also in FIG. 7D, Japanese text "Michi annai o shima sho ka?" is displayed in the bottom area of display 300, and translated English text "Can I help you find your way?" is displayed in the top area of display 300. Furthermore, in FIG. 7D, the characters of the translated English text are displayed in the direction rotated right by 90 degrees from the direction of the characters of the Japanese text.

In other words, display unit 15 determines a display screen layout composed of a first language area and a second language area obtained by dividing the region of display 300 into top and bottom areas, based on the positional relationship indicated by a pre-selected layout information item as illustrated in FIG. 4E. Display unit 15 displays the Japanese text in the first language area and displays the characters of the translated English text in the second language area in the direction rotated right by 90 degrees from the direction of the characters of the Japanese text.

As described above, it is assumed that pre-selected layout information item indicates the display 300 centered positional relationship in which user 51 is present at the first side of display 300, and conversation partner 52 is present at the second side of display 300 which is different from and perpendicular to the first side. In this case, display unit 15 displays the original text and the translated text in the first display area and the second display area, respectively, in such a manner that the characters of the translated text are oriented toward conversation partner 52 in a direction rotated by 90 degrees from the direction of the characters of the original text oriented toward user 51.

Although the example of the display screen in the case where a recognized language is Japanese and a translated language is English with reference to FIGS. 7A to 7D, it is to be noted that a recognized language may be English and a translated language may be Japanese. Examples in this case are described with reference to FIGS. 8A and 8B.

Figure 8A:
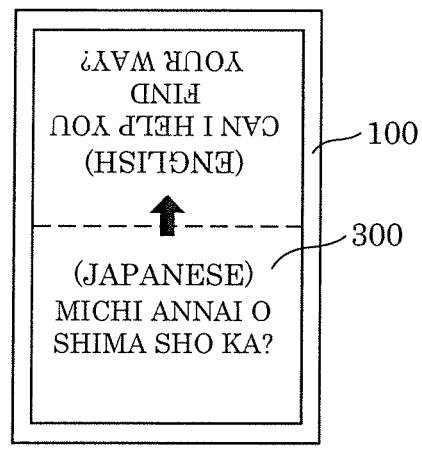
FIG. 8A is a diagram illustrating an example of a display screen to be displayed on the display according to Embodiment 1.
Figure 8B:
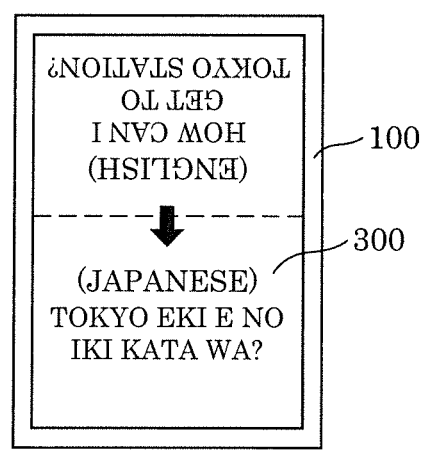
FIG. 8B is a diagram illustrating an example of a display screen to be displayed on the display according to Embodiment 1.

FIGS. 8A and 8B are each a diagram illustrating an example of a display screen to be displayed on display 300 according to Embodiment 1. FIG. 8A is the same as FIG. 7A, and is not repeatedly described here.

FIG. 8B illustrates an example of a display screen in the case where a recognized language is English and a translated language is Japanese when the pre-selected layout information item indicates that speech translation apparatus 100 illustrated in FIG. 4A is used in portrait orientation when user 51 and conversation partner 52 face each other. FIG. 8A is the same as FIG. 8B except for the translation direction, and thus is not described in detail.

[Operations Performed by Speech Translation Apparatus 100]

A description is given of operational processes performed by speech translation apparatus 100 configured as described above.

Figure 9:
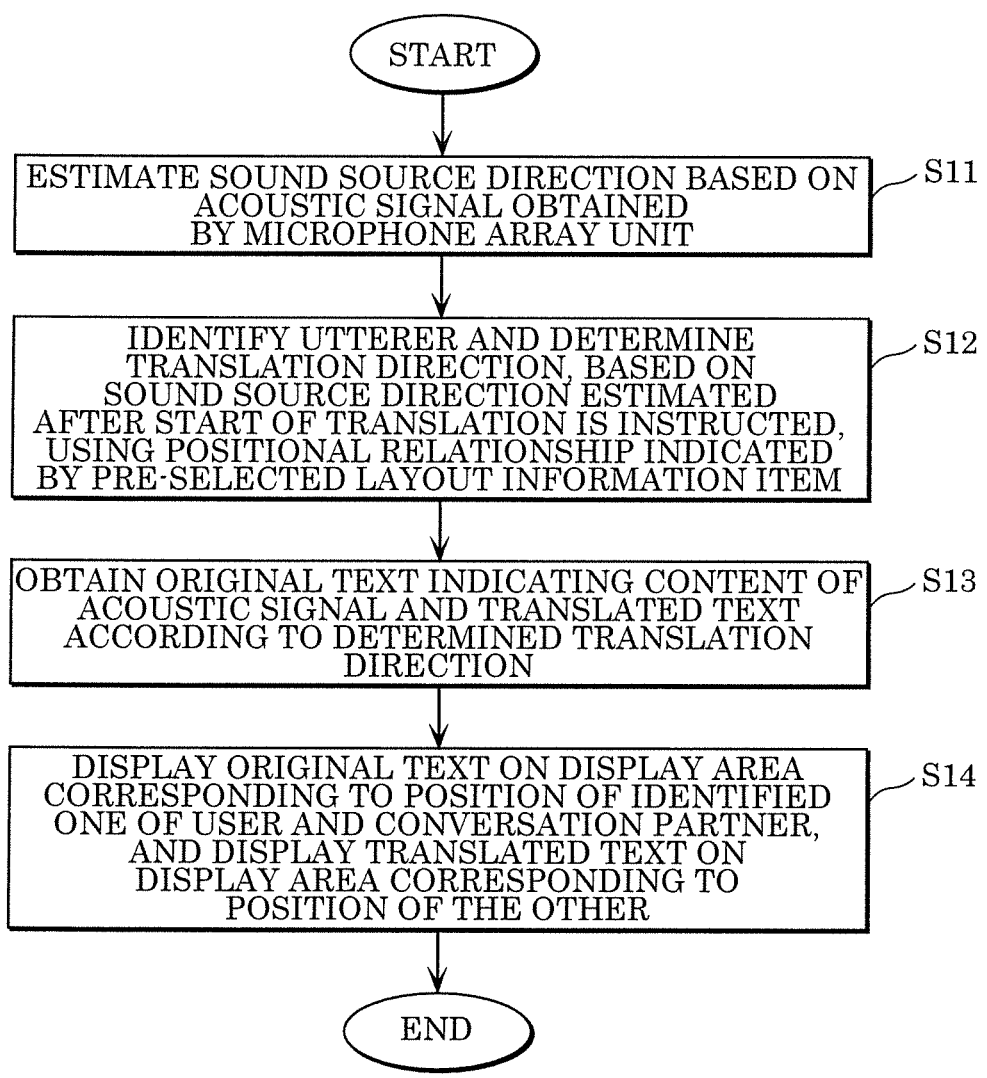
FIG. 9 is a flowchart indicating operational processes performed by the speech translation apparatus according to Embodiment 1.

FIG. 9 is a flowchart indicating operational processes performed by speech translation apparatus 100 according to Embodiment 1.

First, speech translation apparatus 100 estimates a sound source direction based on an acoustic signal obtained by microphone array unit 200 (S11). More specifically, speech translation apparatus 100 estimates a sound source direction by processing the acoustic signal obtained by microphone array unit 200.

Next, speech translation apparatus 100 identifies an utterer and determines a translation direction, based on the sound source direction estimated after start of translation is instructed, using the positional relationship indicated by a pre-selected layout information item (S12). More specifically, speech translation apparatus 100 determines that the utterer who uttered speech is one of user 51 and conversation partner 52, based on the sound source direction estimated in Step S11 after the start of translation is instructed using a translation start button. Here, speech translation apparatus 100 identifies the utterer, using the positional relationship indicated by the pre-selected layout information item included in a plurality of layout information items respectively indicating different positional relationships between user 51, conversation partner 52, and display 300 and stored in storage 11. According to the identified utterer, speech translation apparatus 100 determines the translation direction indicating an input language in which the content of the acoustic signal is to be recognized and an output language into which the content of the acoustic signal is to be translated. The input language is one of a first language and a second language and the output language is the other of the first language and the second language.

Next, speech translation apparatus 100 obtains original text indicating the content of the acoustic signal and translated text obtained by translating the original text according to the translation direction determined in Step S12 (S13). More specifically, speech translation apparatus 100 obtains the text indicating the content of the acoustic signal obtained by causing recognition processor 141 to recognize the acoustic signal in the input language according to the translation direction determined in Step S12. Speech translation apparatus 100 obtains translated text which is obtained by causing translation processor 142 to translate the original text into output language and corresponds to the content of the acoustic signal, according to the translation direction determined in Step S12.

Next, speech translation apparatus 100 displays the original text on a display 300 area corresponding to the position of the identified one of user 51 and conversation partner 52, and displays the translated text on a display 300 area corresponding to the position of the other (S14). More specifically, speech translation apparatus 100 displays the original text on the display 300 area corresponding to the position of the identified one of user 51 and conversation partner 52 identified in Step S13, and displays the translated text on the display 300 area corresponding to the position of the other.

[Effects]

As described above, once the translation start button is pressed when starting translation, speech translation apparatus 100 according to this embodiment automatically switches between an input language and an output language according to utterances of user 51 and conversation partner 52 without requiring a button operation each time when an utterance is started in a conversation between user 51 and conversation partner 52. In this way, operability can be increased. Since the input language and the output language are automatically switched according to each utterance in the conversation between user 51 and conversation partner 52, user 51 and conversation partner 52 can continue the conversation without being stopped to perform button operations, and thus can make the conversation through speech translation apparatus 100 more naturally.

Furthermore, speech translation apparatus 100 according to this embodiment is capable of allowing user 51 and conversation partner 52 to read text easily by displaying the characters of the text indicating the content of the utterance in right direction for each of user 51 and conversation partner 52 according to the positions of user 51 and conversation partner 52. Thus, user 51 and conversation partner 52 can make the conversation through speech translation apparatus 100 more naturally.

It is to be noted that speech translation apparatus 100 according to this embodiment may include recognition processor 141 and translation processor 142 included in a server in a cloud. In this way, it is only necessary for speech translation apparatus 100 to include a simple communication device without including recognition processor 141 and translation processor 142. Thus, speech translation apparatus 100 having a reduced size and weight can be implemented. Furthermore, speech translation apparatus 100 according to this embodiment is capable of recognizing the content of utterances between user 51 and conversation partner 52 more accurately and translating the recognized content more accurately by using recognition processor 141 and translation processor 142 in the server of the cloud in which recognition performances of recognition processor 141 and translation performances of translation processor 142 are gradually increased. Thus, user 51 and conversation partner 52 can make the conversation through speech translation apparatus 100 more naturally.

Speech translation apparatus 100 according to this embodiment may include recognition processor 141 and translation processor 142. In this case, recognition processor 141 and translation processor 142 can be used even in an environment in which communication is impossible or unstable. In this way, user 51 and conversation partner 52 can make the conversation through speech translation apparatus 100 more naturally even in an environment in which communication is impossible or unstable.

In addition, although a description has been given of an example in which speech translation apparatus 100 is used in portrait orientation for easiness in explanation in Embodiment 1, speech translation apparatus 100 may be used in landscape orientation and the same thing can be said.

Hereinafter, descriptions are given of specific examples of a plurality of layout information items in the case where speech translation apparatus 100 is used in landscape orientation, and a method for identifying user 51 or conversation partner 52.

Each of FIGS. 10A to 10E is a diagram illustrating an example of a layout information item stored in storage 11 according to Embodiment 1.

Figure 10A:
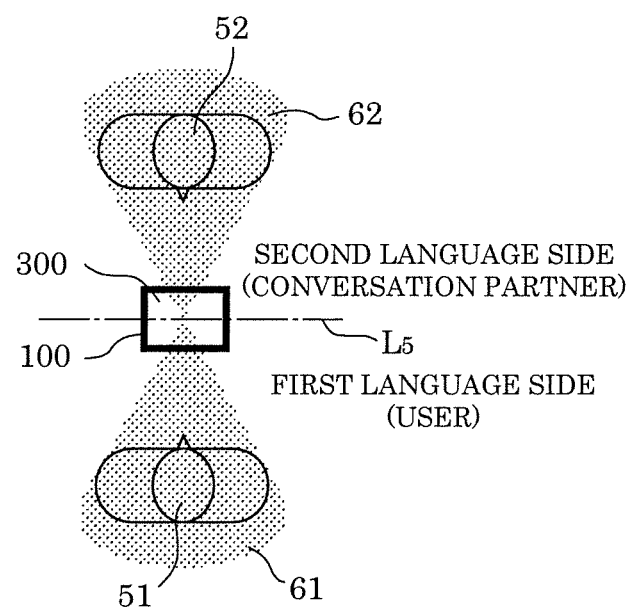
FIG. 10A is a diagram illustrating an example of a layout information item that is stored in the storage according to Embodiment 1.

The layout information item illustrated in FIG. 10A indicates a positional relationship in the case where speech translation apparatus 100 is used in portrait orientation by user 51 and conversation partner 52 facing each other. More specifically, the layout information item indicates the positional relationship in which user 51 who speaks a first language is present at the bottom side with respect to center line $L_5$ which divides display 300 into top and bottom areas, conversation partner 52 who speaks a second language is present at the top side with respect to center line $L_5$, and user 51 and conversation partner 52 face each other. Alternatively, the layout information item illustrated in FIG. 10A may indicate a positional relationship in which user 51 who speaks the first language is present in sound source direction 61 of the bottom side of speech translation apparatus 100 used in landscape orientation and conversation partner 51 who speaks the second language is present in sound source direction 62 of the top side of speech translation apparatus 100. In this way, FIG. 10A illustrates the layout information item indicating the positional relationship in which user 51 and conversation partner 52 face each other across display 300.

Figure 10B:
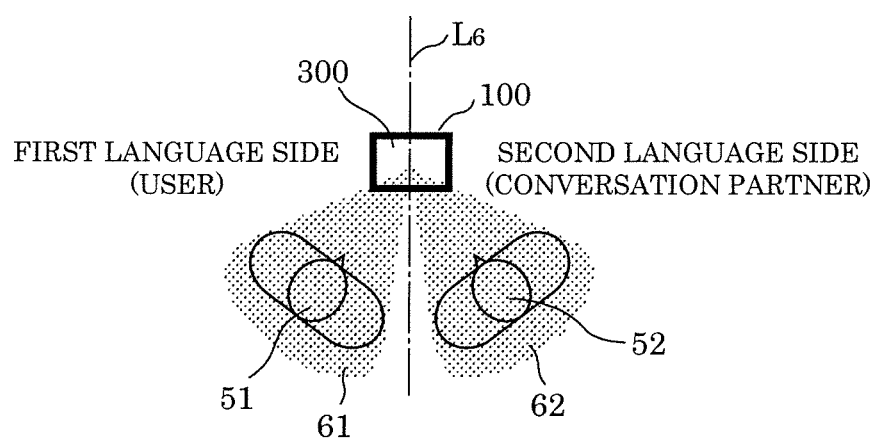
FIG. 10B is a diagram illustrating an example of a layout information item that is stored in the storage according to Embodiment 1.

The layout information item illustrated in FIG. 10B indicates a positional relationship in the case where speech translation apparatus 100 is used in landscape orientation when user 51 and conversation partner 52 are present side by side in such a manner that user 51 is present to the left of conversation partner 52. More specifically, the layout information item indicates the positional relationship in which user 51 who speaks the first language is present at the left side with respect to center line $L_6$ which divides display 300 into right and left areas, conversation partner 52 who speaks the second language is present at the right side with respect to center line $L_6$, and user 51 and conversation partner 51 are present side by side at the bottom side of speech translation apparatus 100. Alternatively, the layout information item illustrated in FIG. 10B may indicate a positional relationship in which user 51 who speaks the first language is present in sound source direction 61 on the lower left side of speech translation apparatus 100 used in landscape orientation and conversation partner 51 who speaks the second language is present in sound source direction 62 on the lower right side of speech translation apparatus 100. Likewise, the layout information item illustrated in FIG. 10C indicates a positional relationship in the case where speech translation apparatus 100 is used in landscape orientation when user 51 and conversation partner 52 are present side by side in such a manner that user 51 is present to the right of conversation partner 52. More specifically, the layout information item indicates the positional relationship in which user 51 who speaks the first language is present at the right side with respect to center line $L_6$ which divides display 300 into right and left areas, conversation partner 52 who speaks the second language is present at the left side with respect to center line $L_6$, and user 51 and conversation partner 52 are present side by side at the bottom side of speech translation apparatus 100. Alternatively, the layout information item illustrated in FIG. 10C may indicate a positional relationship in which user 51 who speaks the first language is present in sound source direction 61 of the lower right side of speech translation apparatus 100 used in landscape orientation and conversation partner 51 who speaks the second language is present in sound source direction 62 of the lower left side of speech translation apparatus 100. In this way, FIG. 10B and FIG. 10C each illustrates the layout information item indicating the positional relationship in which user 51 and conversation partner 52 are present side by side in this order or the inverse order with respect to the one side of display 300.

Figure 10C:
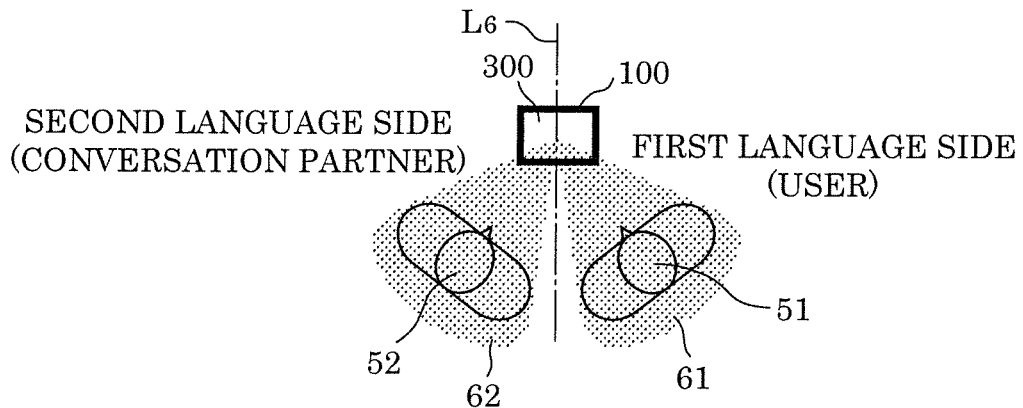
FIG. 10C is a diagram illustrating an example of a layout information item that is stored in the storage according to Embodiment 1.
Figure 10D:
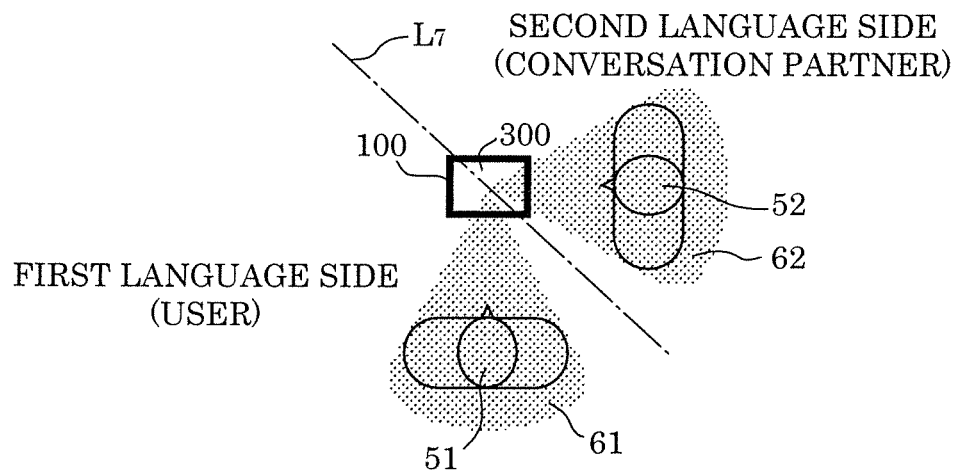
FIG. 10D is a diagram illustrating an example of a layout information item that is stored in the storage according to Embodiment 1.

The layout information item illustrated in FIG. 10D indicates a positional relationship in the case where speech translation apparatus 100 is used in landscape orientation when conversation partner 52 is present at the right angle position to the right of user 51. More specifically, the layout information item indicates the positional relationship in which user 51 is present at the lower left side with respect to left-to-right diagonal $L_7$ which divides display 300, that is, at the bottom side of speech translation apparatus 100, conversation partner 100 is present at the upper right side with respect to left-to-right diagonal $L_7$, that is, at the right side of speech translation apparatus 100, and user 51 and conversation partner 100 are present at right angle positions. Alternatively, the layout information item illustrated in FIG. 10D may indicate a positional relationship in which user 51 who speaks the first language is present in sound source direction 61 at the bottom side of speech translation apparatus 100 used in landscape orientation and conversation partner 51 who speaks the second language is present in sound source direction 62 which is the direction to the right of speech translation apparatus 100. Likewise, the layout information item illustrated in FIG. 10E indicates a positional relationship in the case where speech translation apparatus 100 is used in landscape orientation when conversation partner 52 is present at the right angle position to the left of user 51. More specifically, the layout information item indicates the positional relationship in which user 51 is present at the lower right side with respect to right-to-left diagonal $L_8$ which divides display 300, that is, at the bottom side of speech translation apparatus 100, conversation partner 52 is present at the upper left side with respect to right-to-left diagonal $L_8$, that is, at the left side of speech translation apparatus 100, and user 51 and conversation partner 52 are present at right angle positions. Alternatively, the layout information item illustrated in FIG. 10E may indicate a positional relationship in which user 51 who speaks the first language is present in sound source direction 61 at the bottom side of speech translation apparatus 100 used in landscape orientation and conversation partner 52 who speaks the second language is present in sound source direction 62 which is the direction to the left of speech translation apparatus 100. In this way, FIG. 10D and FIG. 10E each illustrates the layout information item indicating the display 300 centered positional relationship in which user 51 is present with respect to the first side of display 300, and conversation partner 52 is present with respect to the second side of display 300 which is different from and perpendicular to the first side.

FIGS. 11A to 11E are each a diagram indicating indices of segment areas in which user 51 and conversation partner 52 are present when speech translation apparatus 100 according to Embodiment 1 is used in landscape orientation.

Figure 11A:
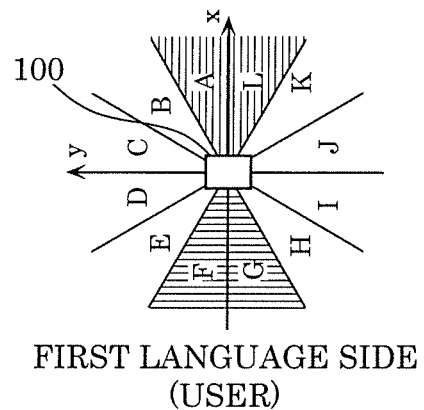
FIG. 11A is a diagram illustrating indices of segment areas in which the user and the conversation partner are present when the speech translation apparatus according to Embodiment 1 is used in landscape orientation.

FIG. 11A is a diagram indicating indices of segment areas in which user 51 and conversation partner 52 are present when a pre-selected layout information item indicates that speech translation apparatus 100 illustrated in FIG. 10A is used in landscape orientation by user 51 and conversation partner 52 facing each other.

In other words, when the sound source direction estimated by sound source direction estimator 12 is indicated by index F or index G in FIG. 11A, controller 13 identifies that the utterer is user 51, based on the positional relationship indicated by the pre-selected layout information item illustrated in FIG. 10A. When the sound source direction estimated by sound source direction estimator 12 is indicated by index A or index L in FIG. 11A, controller 13 identifies that the utterer is user 52, based on the positional relationship indicated by the pre-selected layout information item illustrated in FIG. 10A.

Figure 11B:
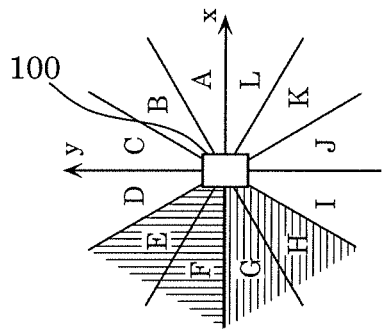
FIG. 11B is a diagram illustrating indices of segment areas in which the user and the conversation partner are present when the speech translation apparatus according to Embodiment 1 is used in landscape orientation.

FIG. 11B is a diagram indicating indices of segment areas in which user 51 and conversation partner 52 are present when a pre-selected layout information item indicates that speech translation apparatus 100 illustrated in FIG. 10B is used in landscape orientation by user 51 and conversation partner 52 who are present side by side in such a manner that user 51 is present to the left of conversation partner 52.

In other words, when the sound source direction estimated by sound source direction estimator 12 is indicated by index E or index F in FIG. 11B, controller 13 identifies that the utterer is user 51, based on the positional relationship indicated by the pre-selected layout information item illustrated in FIG. 10B. When the sound source direction estimated by sound source direction estimator 12 is indicated by index G or index H in FIG. 11B, controller 13 identifies that the utterer is conversation partner 52, based on the positional relationship indicated by the pre-selected layout information item illustrated in FIG. 10B.

Figure 11C:
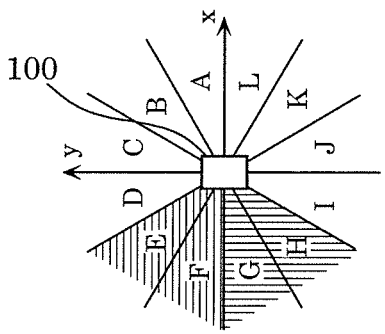
FIG. 11C is a diagram illustrating indices of segment areas in which the user and the conversation partner are present when the speech translation apparatus according to Embodiment 1 is used in landscape orientation.

FIG. 11C is a diagram indicating indices of segment areas in which user 51 and conversation partner 52 are present when the pre-selected layout information item indicates that speech translation apparatus 100 illustrated in FIG. 10C is used in landscape orientation when user 51 is present to the right of conversation partner 52.

In other words, when the sound source direction estimated by sound source direction estimator 12 is indicated by index G or index H in FIG. 11C, controller 13 identifies that the utterer is user 51, based on the positional relationship indicated by the pre-selected layout information item illustrated in FIG. 10C. When the sound source direction estimated by sound source direction estimator 12 is indicated by index E or index F in FIG. 11C, controller 13 identifies that the utterer is conversation partner 52, based on the positional relationship indicated by the pre-selected layout information item illustrated in FIG. 10B.

Figure 11D:
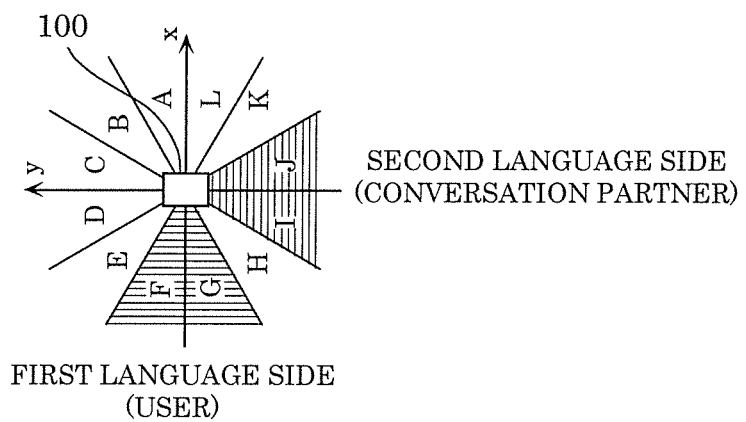
FIG. 11D is a diagram illustrating indices of segment areas in which the user and the conversation partner are present when the speech translation apparatus according to Embodiment 1 is used in landscape orientation.

FIG. 11D is a diagram indicating indices of segment areas in which user 51 and conversation partner 52 are present when the pre-selected layout information item indicates that speech translation apparatus 100 illustrated in FIG. 10D is used in landscape orientation when user 51 is present at the right angle position to the right of conversation partner 52.

In other words, when the sound source direction estimated by sound source direction estimator 12 is indicated by index F or index G in FIG. 11D, controller 13 identifies that the utterer is user 51, based on the positional relationship indicated by the pre-selected layout information item illustrated in FIG. 10D. When the sound source direction estimated by sound source direction estimator 12 is indicated by index I or index J in FIG. 11D, controller 13 identifies that the utterer is conversation partner 52, based on the positional relationship indicated by the pre-selected layout information item illustrated in FIG. 10D.

Figure 11E:
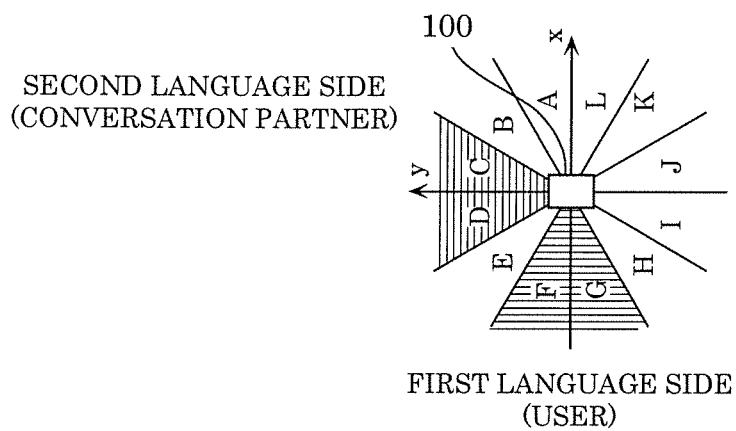
FIG. 11E is a diagram illustrating indices of segment areas in which the user and the conversation partner are present when the speech translation apparatus according to Embodiment 1 is used in landscape orientation.

FIG. 11E is a diagram indicating indices of segment areas in which user 51 and conversation partner 51 are present when the pre-selected layout information item indicates that speech translation apparatus 100 illustrated in FIG. 10D is used in landscape orientation when conversation partner 52 is present at the right angle position to the left of user 51.

Figure 10E:
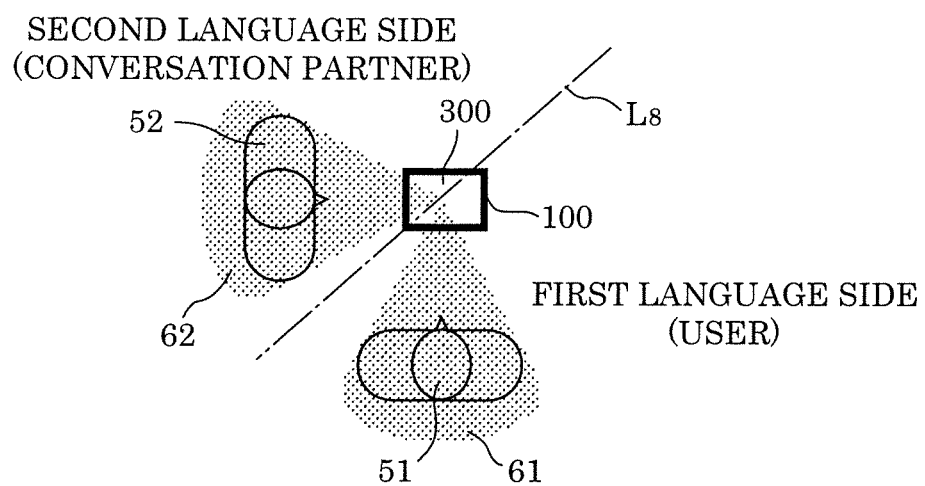
FIG. 10E is a diagram illustrating an example of a layout information item that is stored in the storage according to Embodiment 1.

When the sound source direction estimated by sound source direction estimator 12 is indicated by index F or index G in FIG. 11E, controller 13 identifies that the utterer is user 51, based on the positional relationship indicated by the pre-selected layout information item illustrated in FIG. 10E. When the sound source direction estimated by sound source direction estimator 12 is indicated by index C or index D in FIG. 11E, controller 13 identifies that the utterer is conversation partner 52, based on the positional relationship indicated by the pre-selected layout information item illustrated in FIG. 10E.

Next, a description is given of an example of a display 300 screen displayed by display unit 15 when speech translation apparatus 100 is used in landscape orientation.

Figure 12A:
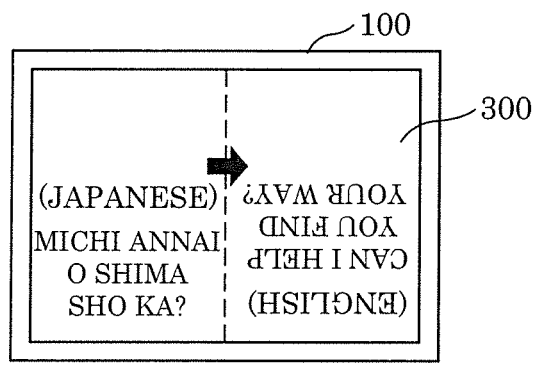
FIG. 12A is a diagram illustrating an example of a display screen displayed on the display when the speech translation apparatus according to Embodiment 1 is used in landscape orientation.
Figure 12B:
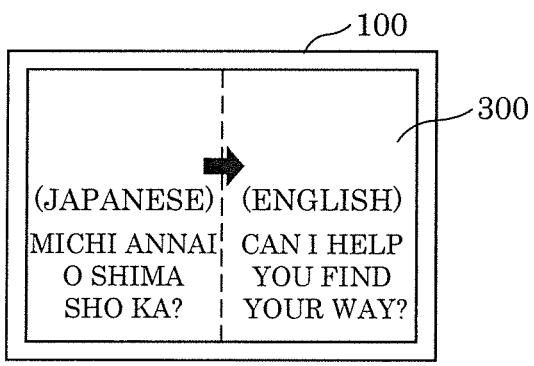
FIG. 12B is a diagram illustrating an example of a display screen displayed on the display when the speech translation apparatus according to Embodiment 1 is used in landscape orientation.
Figure 12C:
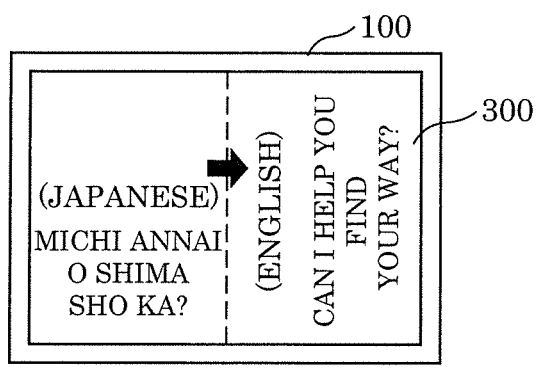
FIG. 12C is a diagram illustrating an example of a display screen displayed on the display when the speech translation apparatus according to Embodiment 1 is used in landscape orientation.

FIGS. 12A to 12C are each a diagram illustrating an example of a display screen to be displayed on display 300 when speech translation apparatus 100 according to Embodiment 1 is used in landscape orientation. Hereinafter, a description is given assuming that a first language is Japanese and a second language is English.

FIG. 12A illustrates an example of a display screen in the case where a language to be recognized (input language) is Japanese and a language into which the input language is to be translated (output language) is English when the pre-selected layout information item indicates that speech translation apparatus 100 illustrated in FIG. 10A is used in landscape orientation by user 51 and conversation partner 52 facing each other. In FIG. 12A, Japanese text "Michi annai o shima sho ka?" is displayed in the left area of display 300, and English text "Can I help you find your way?" is displayed in the right area of display 300. Furthermore, in FIG. 12A, the characters in English text are oriented opposite to characters of the Japanese text.

In other words, display unit 15 determines a display screen layout composed of a first language area and a second language area obtained by dividing the region of display 300 into right and left areas, based on the positional relationship indicated by a pre-selected layout information item as illustrated in FIG. 10A. Display unit 15 displays characters of Japanese text in the first language area and displays characters of English text in the second language area in such a manner that the characters of the English text are oriented opposite to the characters of the Japanese text. In this way, it is assumed that the pre-selected layout information item indicates the positional relationship in which user 51 and conversation partner 52 face each other across display 300. In this case, display unit 15 displays the original text and the translated text in the first display area and the second display area, respectively, in such a manner that the characters of the original text are oriented toward user 51 and the characters of the translated text are oriented toward conversation partner 52.

FIG. 12B illustrates an example of a display screen in the case where a language to be recognized (input language) is Japanese and a language into which the input language is to be translated (output language) is English when the pre-selected layout information item indicates that speech translation apparatus 100 illustrated in FIGS. 10B and 10C is used in landscape orientation by user 51 and conversation partner 52 who are present side by side. Also in FIG. 12B, Japanese text "Michi annai o shima sho ka?" is displayed in the left area of display 300, and English text "Can I help you find your way?" is displayed in the right area of display 300. Furthermore, in FIG. 12B, the characters of the translated English text are oriented in the same direction in which the characters of the Japanese text are oriented.

In other words, display unit 15 determines a display screen layout composed of a first language area and a second language area obtained by dividing the region of display 300 into right and left areas, based on the positional relationship indicated by a pre-selected layout information item as illustrated in each of FIGS. 10B and 10C. Display unit 15 displays the characters of the Japanese text in the first language area and displays the characters of the translated English text in the second language area in such a manner that the characters of the translated English text are oriented in the same direction in which the characters of the Japanese text are oriented. In this way, it is assumed that the pre-selected layout information item indicates the positional relationship in which user 51 and conversation partner 52 are present side by side in this order or in the inverse order at the one side of display 300. In this case, display unit 15 displays the original text and the translated text in the first display area and the second display area, respectively, in such a manner that the characters of the original text and the characters of the translated text are oriented in the same direction.

FIG. 12C illustrates an example in which a recognized language is Japanese and a translated language is English when the pre-selected layout information item indicates that speech translation apparatus 100 illustrated in FIG. 10D is used in landscape orientation when conversation partner 52 is present at the right angle position to the right of user 51. Also in FIG. 12C, Japanese text "annai o shima sho ka?" is displayed in the left area of display 300, and English text "Can I help you find your way?" is displayed in the right area of display 300. Furthermore, in FIG. 12C, the characters of translated English text are displayed in the direction rotated left by 90 degrees from the direction of the characters of the Japanese text.

In other words, display unit 15 determines a display screen layout composed of a first language area and a second language area obtained by dividing the region of display 300 into right and left areas, based on the positional relationship indicated by a pre-selected layout information item as illustrated in FIG. 10D. Display unit 15 displays the Japanese text in the first language area and displays the characters of the translated English text in the second language area in the direction rotated left by 90 degrees from the direction of the characters of the Japanese text.

In this way, it is assumed that pre-selected layout information item indicates the display 300 centered positional relationship in which user 51 is present at the first side of display 300, and conversation partner 52 is present at the second side of display 300 which is different from and perpendicular to the first side. In this case, display unit 15 displays the original text and the translated text in the first display area and the second display area, respectively, in such a manner that the characters of the translated text are oriented toward conversation partner 52 in a direction rotated by 90 degrees from the direction of the characters of the original text oriented toward user 51.

Although the example of the display screen in the case where a recognized language is Japanese and a translated language is English with reference to FIGS. 12A to 12C, it is to be noted that a recognized language may be English and a translated language may be Japanese.

(Variation 1)

Figure 13:
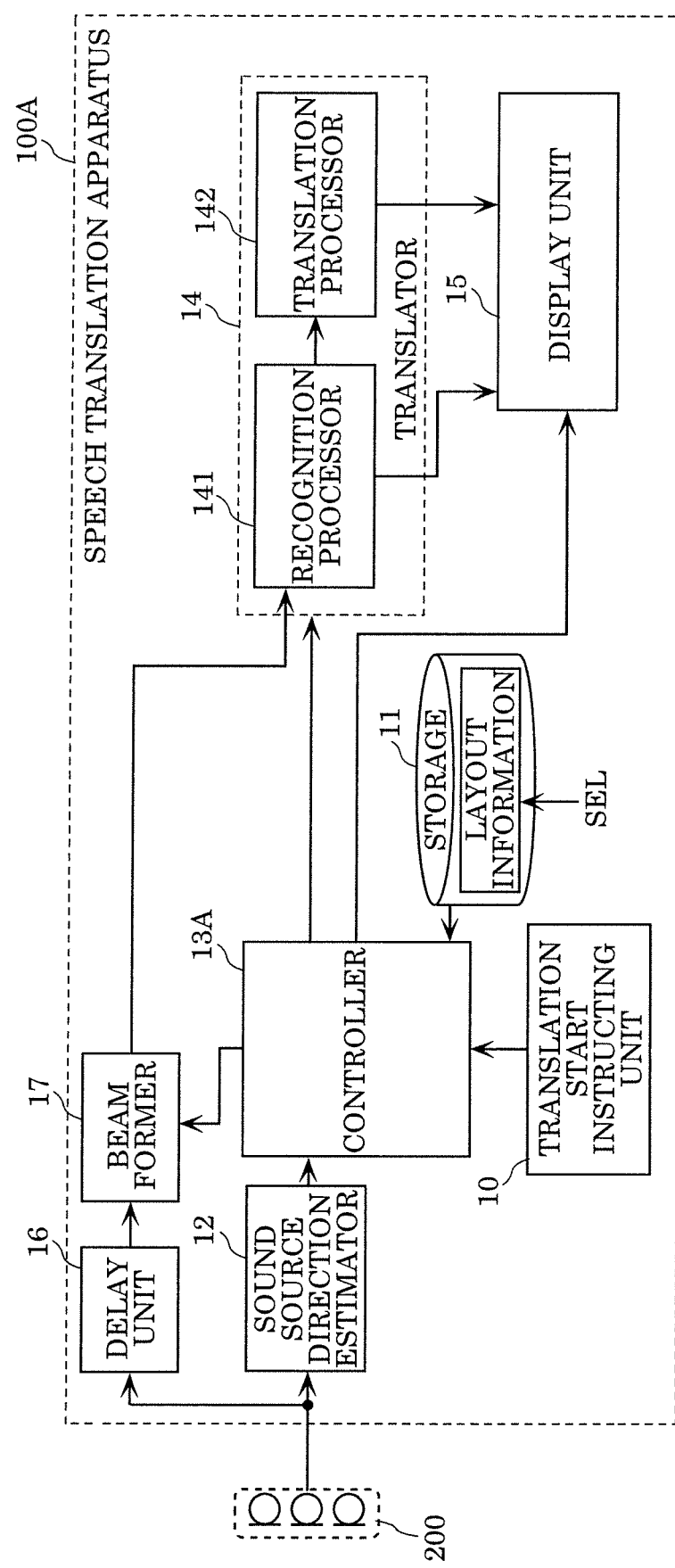
FIG. 13 is a diagram illustrating an example of a configuration of a speech translation apparatus according to Variation 1 of Embodiment 1.

FIG. 13 is a diagram illustrating an example of a configuration of speech translation apparatus 100A according to Variation 1 of Embodiment 1. The same constituent elements as in FIG. 2 are assigned with the same reference signs, and detailed descriptions are not repeated.

Speech translation apparatus 100A according to this variation is different from speech translation apparatus 100 illustrated in FIG. 2 in including controller 13A different in configuration from controller 13 and additionally including delay unit 16 and beam former 17. Hereinafter, differences from Embodiment 1 are mainly described.

[Delay Unit 16]

Delay unit 16 delays an acoustic signal obtained by microphone array unit 200 by a certain period of time. Delay unit 16 outputs the acoustic signal delayed for the certain period of time to beam former 17. It is to be noted that the certain period of time may be sec-order time required for sound source direction estimator 12 to estimate a sound source direction.

[Beam Former 17]

Beam former 17 forms a beam which is an acoustic signal obtained by processing the acoustic signal delayed by delay unit 16 so that the processed acoustic signal has a controlled directivity in a predetermined direction. In this variation, the beam is formed in the sound source direction estimated as the predetermined direction by sound source direction estimator 12.

[Controller 13A]

Controller 13A controls beam former 17 to have a directivity in sound source direction 61 when the utterer is identified to be user 51 based on the sound source direction estimated by sound source direction estimator 12. Controller 13A controls beam former 17 to have a directivity to sound source direction 62 when the utterer is identified to be conversation partner 52 based on the sound source direction estimated by sound source direction estimator 12. The other functions of controller 13A are the same as those of controller 13, and thus the same descriptions are not repeated.

[Effects]

As described above, speech translation apparatus 100A according to this variation is capable of directing a beam to user 51 or conversation partner 52, and thus is capable of receiving utterances of user 51 and conversation partner 52 while reducing surrounding noise. In this way, speech translation apparatus 100A can be used even in an environment in which noise level is high. More specifically, speech translation apparatus 100A according to this variation is capable of controlling beam former 17 to have a directivity to user 51 when the utterer is identified to be user 51 and to conversation partner when the utterer is identified to be conversation partner 52. Since speech translation apparatus 100A is capable of receiving the utterances while removing noise from directions other than the sound source direction in which a current utterer is uttering in this way, it is possible to increase the recognition accuracy of the acoustic signal.

(Variation 2)

Figure 14:
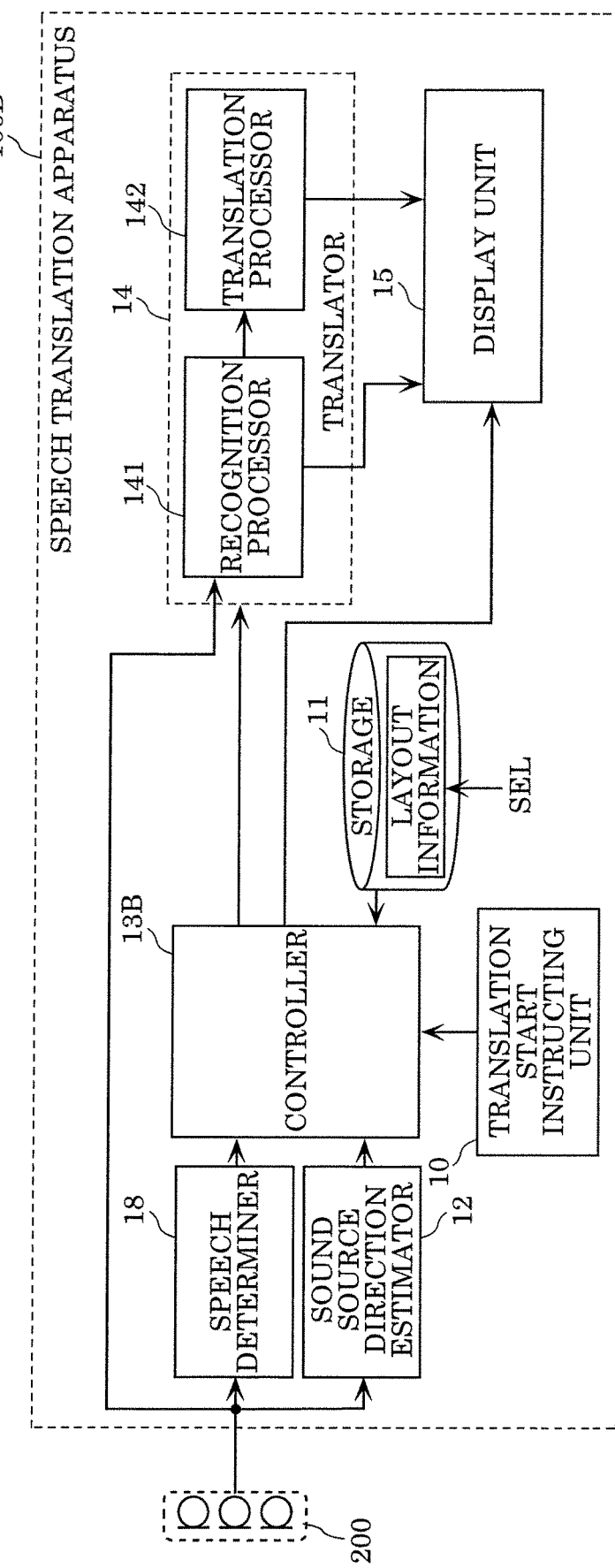
FIG. 14 is a diagram illustrating an example of a configuration of a speech translation apparatus according to Variation 2 of Embodiment 1.

FIG. 14 is a diagram illustrating an example of a configuration of speech translation apparatus 100C according to Variation 2 of Embodiment 1. The same constituent elements as in FIG. 2 are assigned with the same reference signs, and detailed descriptions are not repeated.

Speech translation apparatus 100C according to this variation is different from speech translation apparatus 100 illustrated in FIG. 2 in including controller 13B different in configuration from controller 13 and additionally including speech determiner 18. Hereinafter, differences from Embodiment 1 are mainly described.

[Sound Source Direction Estimator 18]

Speech determiner 18 determines whether an acoustic signal obtained by microphone array unit 200 includes speech. More specifically, speech determiner 18 determines whether the acoustic signal obtained by microphone array unit 200 indicates speech or non-speech.

[Controller 13B]

Controller 13B determines a translation direction only when speech determiner 18 determines that the acoustic signal includes speech and the sound source direction estimated by sound source direction estimator 12 indicates the position of user 51 or the position of conversation partner 52 in the positional relationship indicated by a pre-selected layout information item.

The other functions of controller 13B are the same as those of controller 13, and thus the same descriptions are not repeated.

[Effects]

As described above, speech translation apparatus 100B according to this variation is capable of avoiding or reducing erroneous detections in which nonsteady noise is recognized as speech and detecting only utterances of user 51 and conversation partner 52. Thus, since erroneous operations due to noise can be avoided or reduced, user 51 and conversation partner 52 can make the conversation through speech translation apparatus 100B more naturally. More specifically, speech translation apparatus 100B according to this variation can use an acoustic signal representing only the utterance(s) of user 51 or conversation partner 52, it is possible to increase the recognition accuracy and the translation accuracy of the acoustic signal.

Example

Speech translation apparatus 100 described above may be a combination of speech translation apparatus 100A according to variation 1 and speech translation apparatus 100B according to variation 2. The specific configuration in this case is described as speech translation apparatus 100C in an example below.

<Apparatus Configuration>

Figure 15:
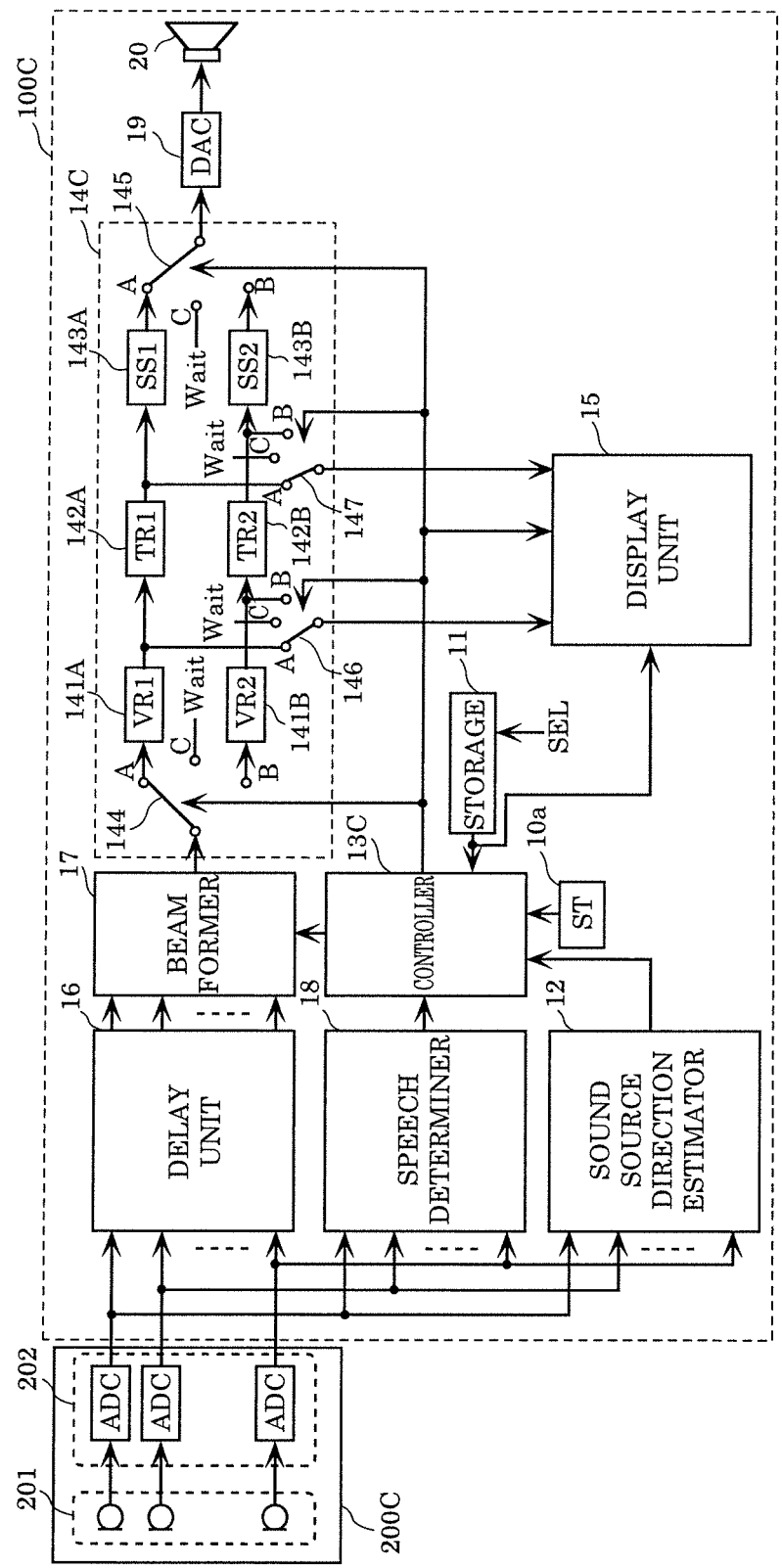
FIG. 15 is a diagram illustrating an example of a configuration of a speech translation apparatus according to an example of Embodiment 1.

FIG. 15 is a diagram illustrating an example of a configuration of speech translation apparatus 100C according to this example of Embodiment 1. The same constituent elements as in FIGS. 2, 13, and 14 are assigned with the same reference signs, and detailed descriptions are not repeated.

Speech translation apparatus 100C is different from speech translation apparatus 100, etc. illustrated in FIGS. 2, 13, and 14 in including translation unit 14C different in configuration from translation unit 14, further including DA convertor 19 and speaker 20, and including translation start button 10*a* instead of translation start instructing unit 10. In addition, microphone array unit 200C illustrated in FIG. 15 may be different in configuration from microphone array unit 200 illustrated in FIG. 2 because of the presence of AD convertor 202 and microphone array 201 which may be included but are not explicitly included in microphone array unit 200. Hereinafter, differences from Embodiment 1 are mainly described.

[AD Convertor 202]

AD convertor 202 is an analog to digital convertor and is denoted as ADC in FIG. 15. AD convertor 202 converts an analog acoustic signal obtained by microphone array 201 to a digital acoustic signal. AD convertor 202 outputs the converted acoustic signal to speech translation apparatus 100C.

[Translation Start Button 10*a*]

Translation start button 10*a* is configured with a button or a switch, and provides a translation start instruction to speech translation apparatus 100C upon being operated by user 51 or conversation partner 52 of speech translation apparatus 100C.

[Controller 13C]

When translation start button 10*a* is pressed, controller 13C determines the directivity of beam former 17 by identifying an utterer based on a result of determination made by speech determiner 18, a result of estimation performed by sound source direction estimator 12, and a selected layout information item, and determines whether to cause translator 14 to perform translation. More specifically, controller 13C determines to cause translator 14 to perform translation when (i) speech determiner 18 determines that the acoustic signal includes speech and (ii) the sound source direction estimated by sound source direction estimator 12 satisfies the positional relationship between user 51 and conversation partner 52 indicated by the pre-selected layout information item.

When causing translator 14 to perform translation, controller 13C determines a translation direction and transfers the determined translation direction to translator 14.

When determining not to cause translator 14 to perform translation, it is only necessary for controller 13C to transfer the determination result without determining any translation direction. The other functions of controller 13C are the same as those of controllers 13, 13A, and 13B, and thus the same descriptions are not repeated.

[Translator 14C]

Translator 14C obtains translated speech data obtained by causing a text synthesis processor to convert translated text to speech data in the output language, and transfers the speech data to speaker 20. In this example, translator 14C includes first speech recognizer 141A, second speech recognizer 141B, first text translator 142A, second text translator 142B, first text synthesizer 143A, and second text synthesizer 143B. Translator 14C includes input language selection switch 144, output language selection switch 145, recognition display selection switch 146, and translation display selection switch 147.

<Recognition Processor 141>

First speech recognizer 141A and second speech recognizer 141B are examples of recognition processor 141. Here, recognition processor 141 recognizes content of an acoustic signal in language to be recognized (input language) which is one of the first language and the second language according to the translation direction determined by controller 13C, and generates text indicating the content of the acoustic signal.

First speech recognizer 141A recognizes speech in the first language. More specifically, first speech recognizer 141A recognizes, in the first language, the content of the acoustic signal transferred via input language selection switch 144 and output from beam former 17. Subsequently, first speech recognizer 141A generates text indicating the content of the acoustic signal in the first language, as the recognition result.

Second speech recognizer 141B recognizes speech in the second language. More specifically, second speech recognizer 141B recognizes, in the second language, the content of the acoustic signal transferred via input language selection switch 144 and output from beam former 17. Subsequently, second speech recognizer 141B generates text indicating the content of the acoustic signal in the second language, as the recognition result.

<Translation Processor 142>

First text translator 142A and second text translator 142B are examples of translation processor 142. Here, translation processor 142 translates the content of the acoustic signal in output language which is the other one of the first language and the second language according to the translation direction determined by controller 13C to generate translated text indicating the content of the acoustic signal.

First text translator 142A translates output data from first speech recognizer 141A into the second language. More specifically, first text translator 142A translates the text indicating the content of the acoustic signal in the first language into the second language to generate translated text indicating the content of the acoustic signal in the second language. The acoustic signal in the first language is the output data generated by first speech recognizer 141A.

Second text translator 142B translates output data from second speech recognizer 141B into the first language. More specifically, second text translator 142B translates the text indicating the content of the acoustic signal in the second language into the first language to generate translated text indicating the content of the acoustic signal in the first language. The acoustic signal in the second language is the output data generated by second speech recognizer 141B.

<Text Synthesis Processor>

First text synthesizer 143A and second text synthesizer 143B are examples of the text synthesis processor. Here, text synthesis processor converts text translated to the output language according to the translation direction determined by controller 13C into speech data.

First text synthesizer 143A converts output data from first text translator 142A to speech data in the second language. More specifically, first text synthesizer 143A converts the text translated to the second language to speech data in the second language. The text translated into the second language is output data generated by first text translator 142A.

Second text synthesizer 143B converts output data from second text translator 142B to speech data in the first language. More specifically, second text synthesizer 143B converts the text translated into the first language to speech data in the first language. The text translated into the first language is output data generated by second text translator 142B.

<Input Language Selection Switch 144>

Input language selection switch 144 switches output destinations of beam former 17 according to the translation direction transferred by controller 13C. For example, when the translation direction is a direction from a first language to a second language, specifically, when an input language is the first language and an output language is the second language, input language selection switch 144 is set to side A illustrated in FIG. 15 so as to transfer the output from beam former 17 to first speech recognizer 141A. As another example, when the translation direction is a direction from the second language to the first language, specifically, when an input language is the second language and an output language is the first language, input language selection switch 144 is set to side B illustrated in FIG. 15 so as to transfer the output from beam former 17 to second speech recognizer 141B.

It is to be noted that input language selection switch 144 maintains a wait state in which the switch is set to side C illustrated in FIG. 15 when controller 13C determines not to cause translator 14 to perform translation.

<Output Language Selection Switch 145>

Output language selection switch 145 switches output destinations of the text synthesis processor according to the translation direction transferred by controller 13C. For example, when the translation direction is the direction from the first language to the second language, output language selection switch 145 is set to side A illustrated in FIG. 15, selects speech data in the second language which is output from first text synthesizer 143A to transfer the speech data to DA converter 19. For example, when the translation direction is the direction from the second language to the first language, output language selection switch 145 is set to side B illustrated in FIG. 15, selects speech data in the first language which is output from second text synthesizer 143B to transfer the speech data to DA converter 19.

It is to be noted that output language selection switch 145 maintains a wait state in which the switch is set to side C illustrated in FIG. 15 when controller 13C determines not to cause translator 14 to perform translation.

<Recognition Display Selection Switch 146>

Recognition display selection switch 146 switches output destinations of recognition processor 141 according to the translation direction transferred by controller 13C. For example, when the translation direction is the direction from the first language to the second language, recognition display selection switch 146 is set to side A illustrated in FIG. 15, selects text in the first language which is output from first speech recognizer 141A, and transfers the text to display unit 15. For example, when the translation direction is the direction from the second language to the first language, recognition display selection switch 146 is set to side B illustrated in FIG. 15, selects text in the second language which is output from second speech recognizer 141B, and transfers the text to display unit 15.

It is to be noted that recognition display selection switch 146 maintains a wait state in which the switch is set to side C illustrated in FIG. 15 when controller 13C determines not to cause translator 14 to perform translation.

<Translation Display Selection Switch 147>

Translation display selection switch 147 switches output destinations of translation processor 142 according to the translation direction transferred by controller 13C. For example, when the translation direction is the direction from the first language to the second language, translation display selection switch 147 is set to side A illustrated in FIG. 15, selects text translated into the second language which is output from first text translator 142A, and transfers the text to display unit 15. For example, when the translation direction is the direction from the second language to the first language, translation display selection switch 147 is set to side B illustrated in FIG. 15, selects text translated into the first language which is output from first text translator 142B, and transfers the text to display unit 15.

It is to be noted that translation display selection switch 147 maintains a wait state in which the switch is set to side C illustrated in FIG. 15 when controller 13C determines not to cause translator 14 to perform translation.

[DA Convertor 19]

DA convertor 19 is a digital to analog convertor, and is denoted as DAC in FIG. 15. DA convertor 19 converts a digital speech signal output from translator 14C to an analog speech signal. DA convertor 19 outputs the converted speech signal to speaker 20.

[Speaker 20]

Speaker 20 outputs speech of the translated text according to the transferred translated speech data. In this example, speaker 20 reproduces and outputs a speech signal of the translated text input by DA convertor 19.

[Operations Performed by Speech Translation Apparatus 100C]

A description is given of operational processes performed by speech translation apparatus 100C configured as described above.

Figure 16:
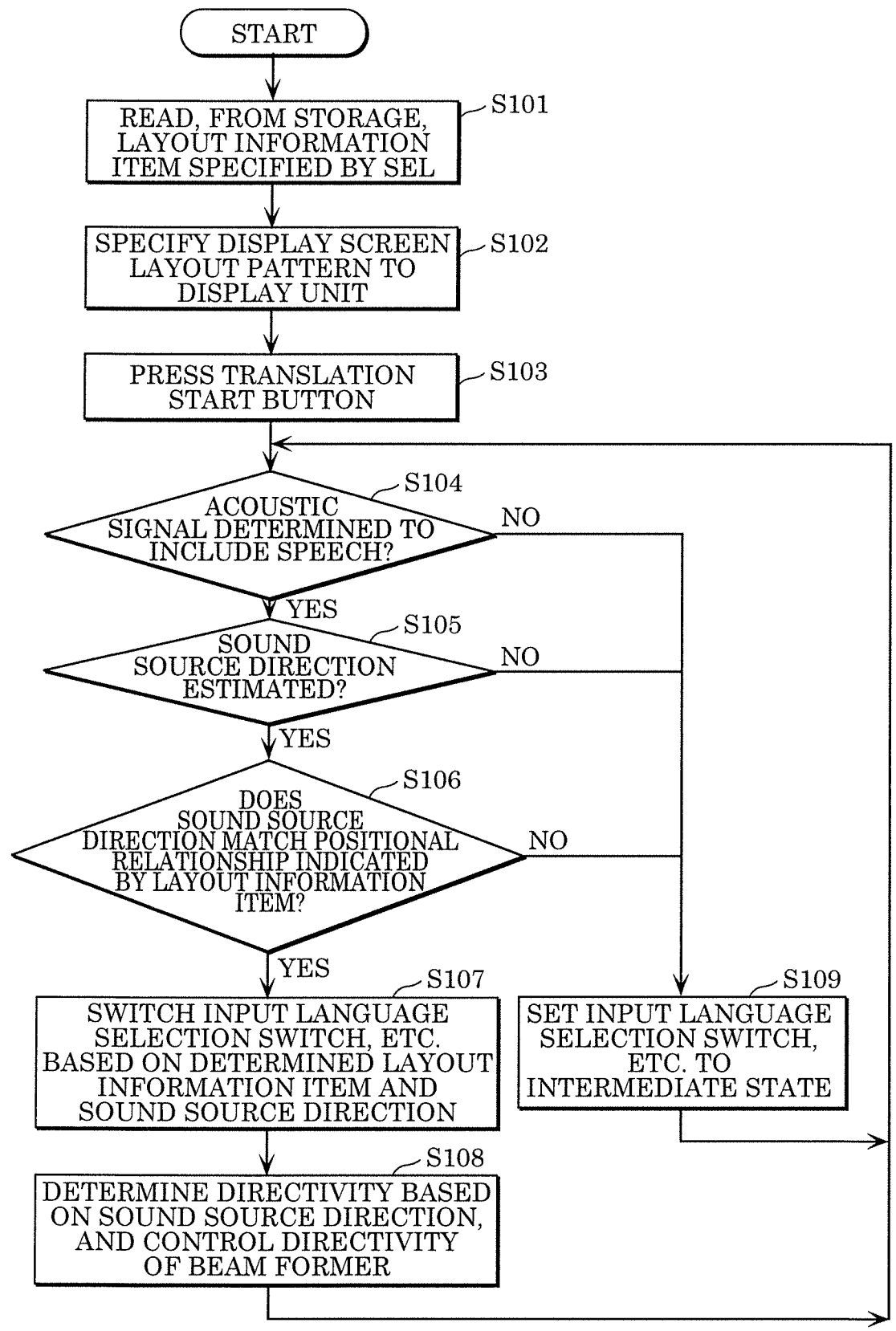
FIG. 16 is a flowchart indicating operational processes performed by the speech translation apparatus according to the example of Embodiment 1.

FIG. 16 is a flowchart indicating operational processes performed by speech translation apparatus 100C according to this example of Embodiment 1. Here, a description is given assuming that a pre-selected layout information indicates a positional relationship in which speech translation apparatus 100C is used in portrait orientation by user 51 and conversation partner 52 facing each other as illustrated in FIG. 4A. It is also assumed here that a first language is Japanese and a second language is English.

First, before speech translation apparatus 100C is used, a layout information item illustrated in FIG. 4A is selected by user 51 or conversation partner 52 from a plurality of layout information items stored in storage 11. In response, speech translation apparatus 100C reads, from storage 11, the layout information item selected by user 51 or conversation partner 52 and specified by selection signal SEL (S101), and notifies controller 13C of the layout information item. Speech translation apparatus 100C then specifies a display screen layout pattern to display unit 15 (S102). In this example, speech translation apparatus 100C specifies, to display unit 15, the display screen layout illustrated in FIG. 7A according to the selected layout information item. In this way, speech translation apparatus 100C is capable of causing display unit 15 to display original Japanese text in a first language area and displays translated English text in a second language area in such a manner that the characters of the translated text are oriented opposite to the characters of the original text.

Next, it is assumed that translation start button 10a is pressed by user 51 or conversation partner 52. In response, translation start button 10a provides a translation start instruction to speech translation apparatus 100C.

Upon receiving the translation start instruction, speech translation apparatus 100C next checks whether an acoustic signal is determined to include speech (S104). When the acoustic signal is determined to include speech (yes in S104), speech translation apparatus 100C checks whether a sound source direction has been estimated (S105). When a sound source direction has been estimated (yes in S105), speech translation apparatus 100C checks whether the estimated sound source direction matches the positional relationship indicated by the read layout information item (S106).

When the estimated sound source direction matches the positional relationship indicated by the read layout information item in Step S106 (yes in S106), speech translation apparatus 100C switches input language selection switch 144, etc. based on the layout information item and the sound source direction (S107). More specifically, when the detected sound source direction matches the positional relationship indicated by the read layout information item, speech translation apparatus 100C sets input language selection switch 144, etc. to side A or side B illustrated in FIG. 15 according to the determined translation direction.

Speech translation apparatus 100C then determines a directivity based on the sound source direction estimated in Step S105, and controls the directivity by changing a parameter of beam former 17 (S108).

For example, a description is given using the configuration in FIG. 16. When translation start button 10a is pressed and user 51 utters, uttered speech is input to microphone array 201 and converted to a digital acoustic signal by AD convertor 202. The acoustic signal output from AD convertor 202 is input to sound source direction estimator 12, delay unit 16, and speech determiner 18. Delay unit 16 delays the acoustic signal by time required for sound source direction estimator 12 to estimate a sound source direction, and outputs the delayed acoustic signal to beam former 17.

Speech determiner 18 also determines whether the input acoustic signal indicates speech by determining whether the input acoustic signal is speech or non-speech. Sound source direction estimator 12 estimates the sound source direction based on the input acoustic signal. Sound source direction estimator 12 outputs the estimated sound source direction upon estimating the sound source direction, and outputs information indicating that a sound source direction has not yet been estimated before the estimation. When the acoustic signal has been determined to include speech by speech determiner 18 and the sound source direction has been determined to be indicated by index I or index J illustrated in FIG. 6A by sound source direction estimator 12, controller 13C identifies a current utterer is user 51, and determines a translation direction from Japanese to English.

In this way, speech translation apparatus 100C obtains original text indicating the content of the acoustic signal and translated text obtained by translating the original text according to the translation direction determined in Step S107. Speech translation apparatus 100C displays Japanese text in the first language area and displays the characters of English text in the second language area in such a manner that the characters of the English text are oriented opposite to the characters of the Japanese text.

A transition to Step S109 is made when an acoustic signal is determined not to include speech in Step S106 (no in S104), when a sound source direction has not been estimated in Step S105 (no in S105), and when the detected sound source direction does not match the positional relationship indicated by the read layout information item (no in S106).

In Step S109, speech translation apparatus 100C sets input language selection switch 144, etc. to a wait state. In this way, speech translation apparatus 100C causes display unit 15 to display an input wait state, which contributes to energy saving because any translation process does not need to be performed on the acoustic signal representing non-speech such as noise, in addition to avoiding or reducing display of nonunderstandable indication.

[Effects]

As described above, speech translation apparatus 100C according to this example is capable of directing a beam to user 51 or conversation partner 52, and thus is capable of receiving utterances of user 51 and conversation partner 52 while reducing surrounding noise. In this way, speech translation apparatus 100C can be used even in an environment in which noise level is high. More specifically, speech translation apparatus 100C according to this example is capable of controlling beam former 17 to have a directivity to user 51 when the utterer is identified to be user 51 and to conversation partner 52 when the utterer is identified to be conversation partner 52. Since speech translation apparatus 100C is capable of receiving the utterances while removing noise from directions other than the sound source direction in which a current utterer is uttering in this way, it is possible to increase the recognition accuracy of the acoustic signal.

Since speech translation apparatus 100C according to this example translates each utterance of one of user 51 and conversation partner 52 into a language of the other one, each of user 51 and conversation partner 52 does not take the trouble of reading characters indicating the content of the utterance by the other one in the conversation, which further increases the operability of speech translation apparatus 100C. Since user 51 and conversation partner 52 can make conversation using only speech in this way, user 51 and conversation partner 52 can make the conversation via speech translation apparatus 100C more naturally.

Embodiment 2

A layout information item has been described to be selected in advance and fixed in Embodiment 1, but this is a non-limiting example. When the positions of user 51 and conversation partner 52 are different from the positional relationship indicated by a pre-selected layout information item, another layout information item may be selected. Hereinafter, differences from Embodiment 1 are mainly described.

Figure 17:
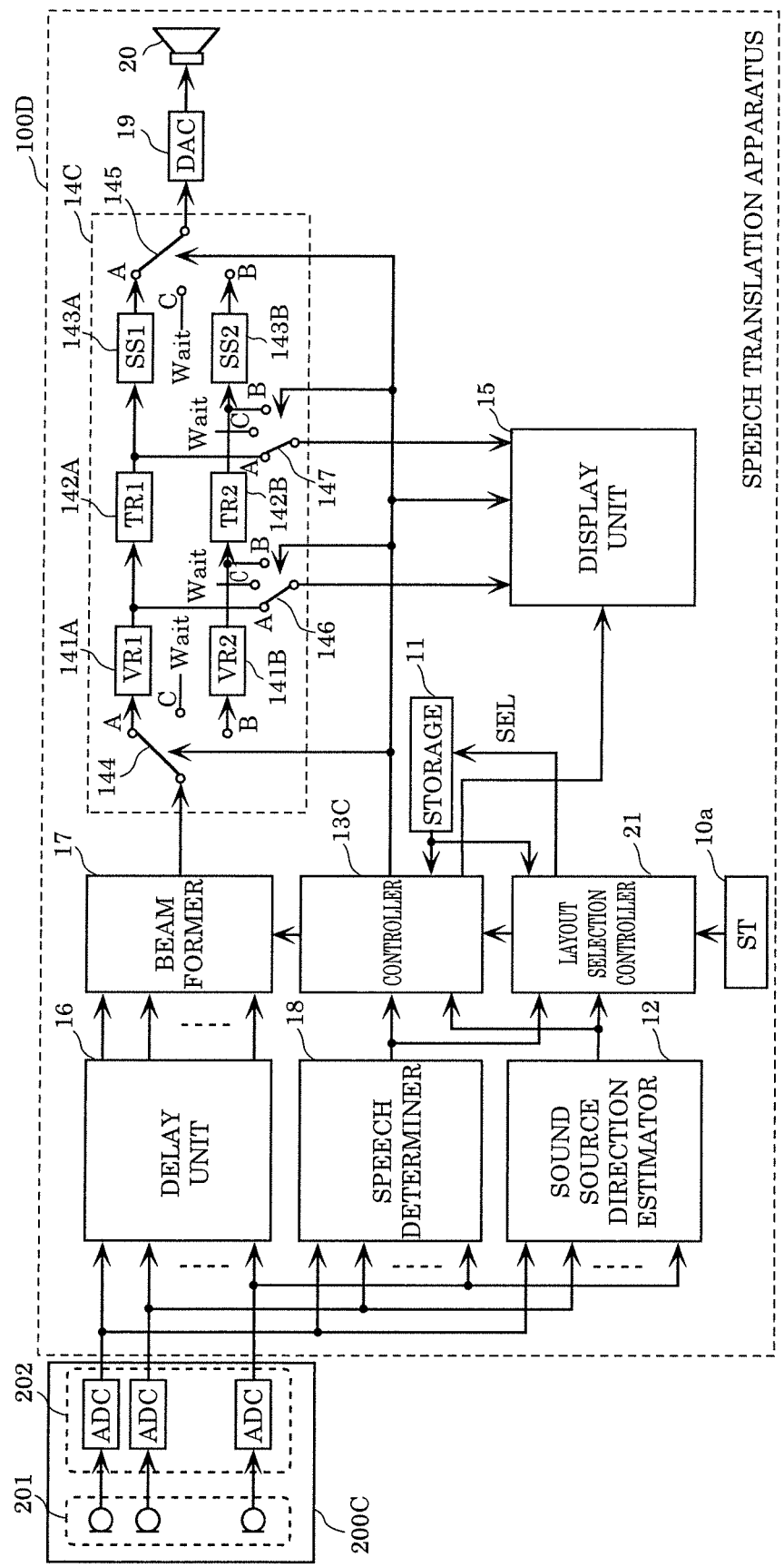
FIG. 17 is a diagram illustrating an example of a configuration of a speech translation apparatus according to Embodiment 2.

FIG. 17 is a diagram illustrating an example of a configuration of speech translation apparatus 100D according to Embodiment 2. The same constituent elements as in FIG. 15 are assigned with the same reference signs, and detailed descriptions are not repeated.

Speech translation apparatus 100D according to this embodiment is different from speech translation apparatus 100C according to the example of Embodiment 1 in including layout selection controller 21. The other constituent elements perform the same operations as described in the example of Embodiment 1.

[Layout Selection Controller 21]

When start of translation is instructed by translation start button 10a when operated by user 51, layout selection controller 21 initializes the pre-selected layout information item. Layout selection controller 21 selects as a layout information item from a plurality of layout information items stored in storage 11, based on the result of a determination made by speech determiner 18 and the result of an estimation performed by sound source direction estimator 12.

More specifically, after the initialization of the pre-selected layout information item, layout selection controller 21 first estimates, to be the direction in which user 51 is present, the sound source direction estimated by sound source direction estimator 12 when an acoustic signal is determined to include speech by speech determiner 18. After estimating the direction in which user 51 is present, when (i) the acoustic signal is determined to include speech by speech determiner 18 and (ii) the sound source direction estimated by sound source direction estimator 12 is a direction different from the direction in which user 51 is present, layout selection controller 21 determines the different direction to be the direction in which conversation partner 52 is present. Layout selection controller 21 selects one of the plurality of layout information items as the layout information item, based on the direction in which user 51 is present and the direction in which conversation partner 52 is present.

In other words, this embodiment is on the premise that the direction in which speech translation apparatus 100D is used has been known, an operation such as a press of translation start button 10a is performed by user 51, and user 51 utters first. In this case, when translation start button 10a is pressed and speech determiner 18 first determines speech included in an acoustic signal, layout selection controller 21 is capable of determining the direction in which user 51 is present using the sound source direction estimated by sound source direction estimator 12 based on the acoustic signal. When an acoustic signal indicating speech of a second utterance is determined and a sound source direction different from the direction in which user 51 is present is estimated, layout selection controller 21 is capable of determining the direction in which conversation partner 52 is present. In this way, layout selection controller 21 is capable of newly selecting the determined layout information item indicating the positional relationship that matches the direction in which user 51 is present and the direction in which conversation partner 52 is present, from the plurality of layout information items stored in storage 11.

[Operations Performed by Speech Translation Apparatus 100D]

A description is given of operational processes performed by speech translation apparatus 100D configured as described above.

Figure 18:
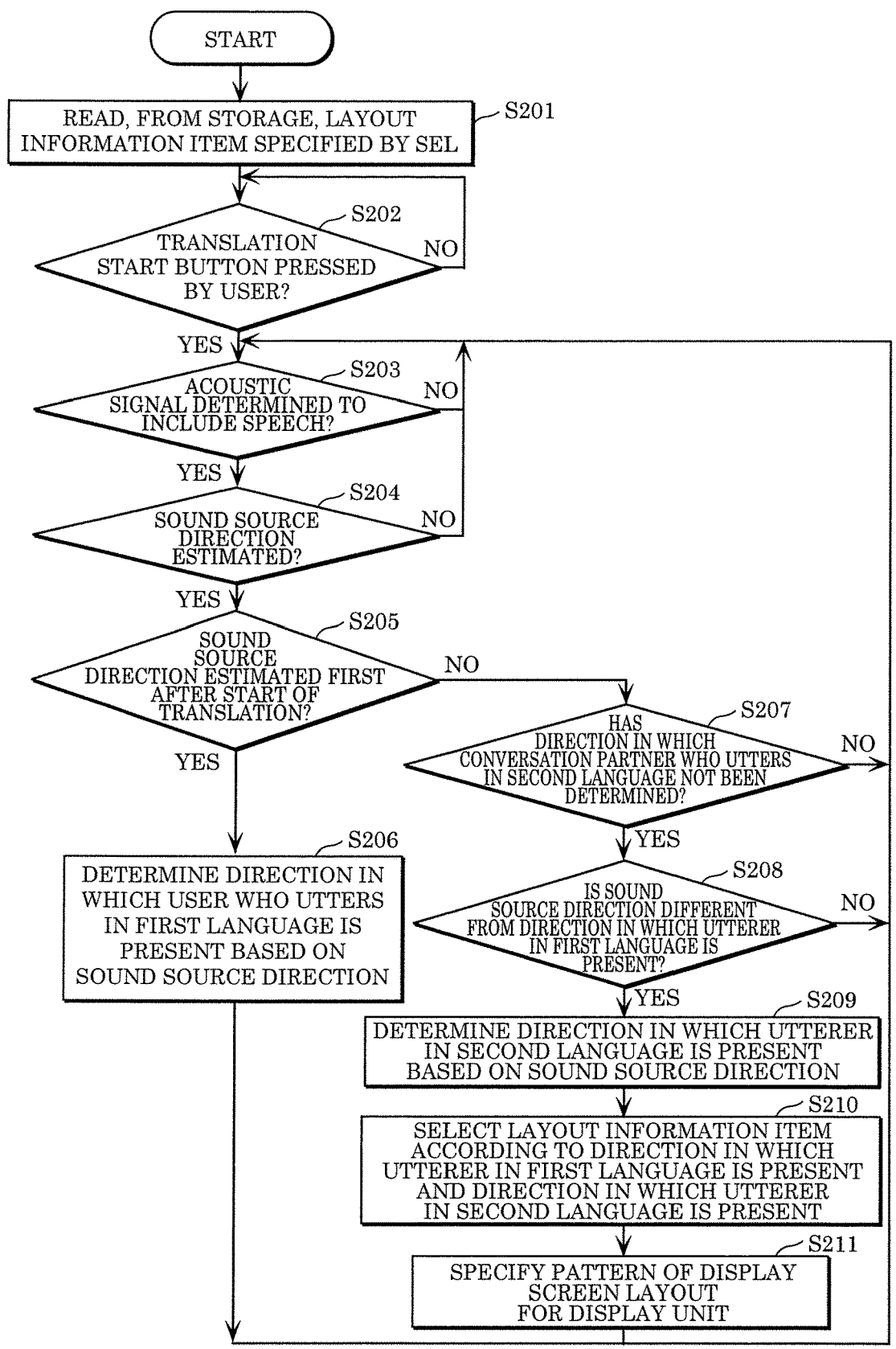
FIG. 18 is a flowchart indicating operational processes performed by the speech translation apparatus according to Embodiment 2.

FIG. 18 is a flowchart indicating operational processes performed by speech translation apparatus 100D according to Embodiment 2.

First, in speech translation apparatus 100D, a layout information item that was planned to be used is selected by user 51. For this reason, speech translation apparatus 100D reads, from storage 11, the layout information item selected by user 51 and specified by selection signal SEL (S201), and notifies controller 13C of the layout information item. It is to be noted that only the orientation of speech translation apparatus 100D when used (in portrait or landscape orientation) may be set by user 51 in advance instead of the layout information item.

In this state, speech translation apparatus 100, specifically layout selection controller 21 checks whether translation start button 10a has been pressed by user 51 (S202).

When layout selection controller 21 confirms that translation start button 10a has been pressed by user 51 (yes in S202), layout selection controller 21 checks whether an acoustic signal is determined to include speech (S203). When an acoustic signal is determined to include speech (yes in S203), layout selection controller 21 checks whether the sound source direction has been estimated (S204). When the sound source direction has been estimated (yes in S204), layout selection controller 21 first determines whether the estimated sound source direction is the sound source direction estimated first after the translation start instruction (S205). A return is made to Step S203 when an acoustic signal is determined not to include speech in Step S203 (no in S203), and when a sound source direction has not been estimated in Step S204 (no in S204).

When the estimated sound source direction is the sound source direction estimated first after the translation start instruction in Step S205 (yes in S205), layout selection controller 21 determines the direction in which user 51 who utters in first language is present (S206) based on the sound source direction, and proceeds to Step S203.

When the estimated sound source direction is not the sound source direction estimated first after the translation start instruction in Step S205 (no in S205), layout selection controller 21 checks whether the direction in which conversation partner 52 who utters in the second language has not been determined (S207). Layout selection controller 21 determines whether the sound source direction estimated in Step S204 is different from the direction in which the utterer who utters in the first language (that is, user 51) is present (S208). When the sound source direction estimated in Step S207 is different from the direction in which the utterer who utters in the first language (that is, user 51) is present (yes in S208), layout selection controller 21 determines the direction in which the utterer who utters in the second language (conversation partner 52) is present based on the sound source direction estimated in Step S204 (S209). A return to Step S203 is made when the direction in which the utterer who utters in the second language is not undetermined in Step S207 (no in S207), and when it is determined in Step S208 that the sound source direction estimated in Step S207 is the same as the direction in which the utterer who utters in the first language (that is, user 51) is present.

Next, in Step S210, layout selection controller 21 selects a layout information item according to the utterer who utters in the first language (that is, user 51) determined in Step S206 and the utterer who utters in the second language (that is, conversation partner 52) determined in Step S209 (S210). More specifically, layout selection controller 21 is capable of newly selecting the determined layout information item indicating the position that matches the direction in which user 51 is present and the direction in which conversation partner 52 is present, from the plurality of layout information items stored in storage 11. Speech translation apparatus 100D then reads the newly selected layout information item from storage 11, and notifies controller 13C the newly selected layout information item.

Speech translation apparatus 100D then specifies for display unit 15 a pattern of a display screen layout according to the newly selected layout information item (S211).

[Effects]

As described above, speech translation apparatus 100D according to Embodiment 2 is capable of displaying characters indicating the content of utterances in right orientations according to the positions of user 51 and conversation partner 52 even when the positional relationship between user 51 and conversation partner 52 is different from a previously set positional relationship. Thus, speech translation apparatus 100D is capable of displaying the characters toward user 51 and conversation partner 52 in an easy to read manner. In this way, operability can be further increased.

Although the speech translation apparatuses according to one or more aspects of the present disclosure have been described above based on the embodiments and variations, the present disclosure is not limited to the embodiments, etc. The present disclosure may cover and encompass embodiments that a person skilled in the art may arrive at by adding various kinds of modifications to any of the above embodiments or by arbitrarily combining some of the constituent elements in different embodiments within the scope of the present disclosure. For example, the present disclosure covers and encompasses the following cases.

(1) A recognition process and a translation process performed by recognition processor 141 and translation processor 142 of translator 14 of each of speech translation apparatuses 100, 100A to 100D as described above may be performed on a cloud. In this case, it is only necessary for recognition processor 141 and translation processor 142 to communicate with the cloud to transmit current data to be processed to the cloud, and obtain data which has been subjected to the recognition process and the translation process. Likewise, a text synthesis process performed by the text synthesis processor of each of speech translation apparatuses 100C and 100D as described above may be performed on the cloud. In this case, it is only necessary for the text synthesis processor to transmit translated text which is current data to be processed to the cloud and obtain speech data converted from the translated text.

(2) Although the above-described speech translation apparatuses, etc. are used as tools for communication between different language speakers and translate speech of each of the languages spoken by one of the utterers into speech of the language spoken by the other one of the utterers, this is a non-limiting example. The above-described speech translation apparatuses, etc. may be used as tools for communication between a plurality of utterers who speak two or more different languages. In this case, each speech translation apparatus may recognize the language of an utterance of one of the plurality of utterers, and translate the content of the utterance in the recognized language into one or more languages spoken respectively by one or more of the plurality of utterers. The speech translation apparatus may then display the translated text of each output language on a corresponding display area which is of display 300 and corresponds to the position of a corresponding conversation partner, and display the original text on a display area which is of display 300 and corresponds to the position of the user.

(3) Each of the apparatuses, etc. is, specifically, a computer system including a microprocessor, a ROM, a RAM, a hard disk unit, a display unit, a keyboard, a mouse, and so on. A computer program is stored in the RAM or the hard disk unit. The respective constituent elements achieve their functions through the microprocessor's operations according to the computer program. Here, the computer program is configured by combining plural instruction codes indicating instructions for the computer in order to achieve the predetermined functions.

(4) A part or all of the constituent elements of each speech translation apparatus may be configured with a single system-LSI (Large-Scale Integration). The system-LSI is a super-multi-function LSI manufactured by integrating constituent units on a single chip, and is specifically a computer system configured to include a microprocessor, a ROM, a RAM, and so on. A computer program is stored in the RAM. The system-LSI achieves its function through the microprocessor's operations according to the computer program.

(5) A part or all of the constituent elements constituting the speech translation apparatuses, etc. may be configured as an IC card which can be attached to and detached from the respective apparatuses or as a stand-alone module. The IC card or the module is a computer system configured from a microprocessor, a ROM, a RAM, and so on. The IC card or the module may also be included in the aforementioned super-multi-function LSI. The IC card or the module achieves its functions through the microprocessor's operations according to the computer program. The IC card or the module may also be implemented to be tamper-resistant.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used for speech translation apparatuses, speech translation methods, and recording media storing the speech translation methods, which are used as tools for communication between different language speakers.

What is claimed is:

1. A speech translation apparatus, comprising:
a translation start button which instructs start of translation when operated by one of a user of the speech translation apparatus and a conversation partner of the user; and
one or more hardware processors configured to execute at least one program and cause the speech translation apparatus to perform the functions of:

a sound source direction estimator which estimates a sound source direction by processing an acoustic signal obtained by a microphone array;

a controller which (i) identifies that an utterer who utters speech is one of the user and the conversation partner, from (a) the sound source direction estimated by the sound source direction estimator after the start of the translation is instructed by the translation start button and (b) a positional relationship indicated by a layout information item selected in advance from a plurality of layout information items that are stored in storage and respectively indicate different positional relationships between the user, the conversation partner, and a display with respect to the speech translation apparatus, and (ii) determines a translation direction indicating an input language in which content of the acoustic signal is recognized and an output language into which the content of the acoustic signal is translated, the input language being one of a first language used by the user and predetermined and a second language used by the conversation partner and predetermined and the output language being the other one of the first language and the second language, the second language being different from the first language;

a translator which obtains, according to the translation direction determined, (i) original text indicating the content of the acoustic signal obtained by causing a recognition processor to recognize the acoustic signal in the input language and (ii) translated text indicating the content of the acoustic signal obtained by causing a translation processor to translate the original text into the output language; and a display unit which displays the original text on a first area of the display, and simultaneously displays the translated text on a second area of the display, the first area corresponding to a position of the identified one of the user and the conversation partner, the second area corresponding to a position of the other one of the user and the conversation partner.

2. The speech translation apparatus according to claim 1, wherein the translator includes the recognition processor and the translation processor.

3. The speech translation apparatus according to claim 1, wherein the translator is connectable to a server via a network, and the server includes at least one of the recognition processor and the translation processor.

4. The speech translation apparatus according to claim 1, wherein the one or more hardware processors are further configured to execute the at least one program and cause the speech translation apparatus to perform the functions of a delay unit which delays the acoustic signal obtained by the microphone array unit for a certain period of time; and a beam former which forms a beam which is an acoustic signal having a controlled sound receiving directivity in a predetermined direction by processing the acoustic signal delayed by the delay unit, wherein the beam former forms the beam in the sound source direction estimated by the sound source direction estimator to be the predetermined direction.

5. The speech translation apparatus according to claim 1, further comprising:

a speaker, wherein the translator obtains translated speech data obtained by causing a text synthesis processor to convert the translated text into speech data of the output language, and transfers the translated speech data to the speaker, and the speaker outputs speech of the translated text according to the translated speech data transferred.

6. The speech translation apparatus according to claim 1, wherein the display has an elongated shape, and when the layout information item indicates a positional relationship in which the user and the conversation partner face each other across the display, the display unit displays the original text and the translated text in the first area and the second area, respectively, in such a manner that characters of the original text are oriented toward the identified one of the user and the conversation partner and characters of the translated text are oriented toward the other one of the user and the conversation partner.

7. The speech translation apparatus according to claim 1, wherein the display has an elongated shape, and when the layout information item indicates a display-centered positional relationship in which the user is present at a first side of the display and the conversation partner is present at a second side of the display which is different from and perpendicular to the first side, the display unit displays the original text and the translated text in the first area and the second area, respectively, in such a manner that characters of the translated text are oriented toward the other one of the user and the conversation partner in a direction rotated by 90 degrees from a direction of the characters of the original text oriented toward the identified one of the user and the conversation partner.

8. The speech translation apparatus according to claim 1, wherein the display has an elongated shape, and the plurality of layout information items include: (i) a positional relationship in which the user and the conversation partner face each other across the display; (ii) a positional relationship in which the user and the conversation partner are present side by side at one of sides of the display either in this order or an inverse order; and (iii) a display-centered positional relationship in which the user is present at the first side of the display and the conversation partner is present at the second side of the display which is different from and perpendicular to the first side.

9. The speech translation apparatus according to claim 1, wherein the one or more hardware processors are further configured to execute the at least one program and cause the speech translation apparatus to perform the functions of a speech determiner which determines whether the acoustic signal obtained by the microphone array unit includes speech, wherein the controller determines the translation direction only when (i) the acoustic signal is determined to include speech by the speech determiner and (ii) the sound source direction estimated by the sound source direction estimator indicates the position of the user or the position of the conversation partner in the positional relationship indicated by the layout information item.

10. The speech translation apparatus according to claim 9, wherein the one or more hardware processors are further configured to execute the at least one program and cause the speech translation apparatus to perform the functions of:

a layout selection controller which (i) initializes the layout information item selected in advance when the start of the translation is instructed by the translation start button operated by the user, and (ii) selects one of the plurality of layout information items stored in the storage as the layout information item, based on a result of the determination made by the speech determiner and a result of the estimation performed by the sound source direction estimator.

11. The speech translation apparatus according to claim 10,
wherein the layout selection controller:
after initializing the layout information item selected in advance, estimates, to be the direction in which the user is present, the sound source direction first estimated by the sound source direction estimator when the acoustic signal is determined to include speech by the speech determiner;
after estimating the direction in which the user is present, when (i) the acoustic signal is determined to include speech and (ii) the sound source direction estimated by the sound source direction estimator is a direction different from the direction in which the user is present, determines the different direction to be the direction in which the conversation partner is present; and
selects one of the plurality of layout information items as the layout information item, based on the direction in which the user is present and the direction in which the conversation partner is present.

12. A speech translation method performed by a speech translation apparatus including a translation start button which instructs start of translation when operated by one of a user of the speech translation apparatus and a conversation partner of the user, the speech translation method further comprising:
estimating a sound source direction by processing an acoustic signal obtained by a microphone array unit;
(i) identifying that an utterer who utters speech is one of the user and the conversation partner of the user, from (a) the sound source direction estimated by the sound source direction estimator after the start of the translation is instructed by the translation start button and (b) a positional relationship indicated by a layout information item selected in advance from a plurality of layout information items that are stored in storage and respectively indicate different positional relationships between the user, the conversation partner, and a display with respect to the speech translation apparatus, and (ii) determining a translation direction indicating an input language in which content of the acoustic signal is recognized and an output language into which the content of the acoustic signal is translated, the input language being one of a first language used by the user and predetermined and a second language used by the conversation partner and predetermined and the output language being the other one of the first language and the second language, the second language being different from the first language;
obtaining, according to the translation direction determined in the determining, (i) original text indicating the content of the acoustic signal obtained by causing a recognition processor to recognize the acoustic signal in the input language and (ii) translated text indicating the content of the acoustic signal obtained by causing a translation processor to translate the original text into the output language; and
displaying the original text on a first area of the display, and simultaneously displaying the translated text on a second area of the display, the first area corresponding to a position of the identified one of the user and the conversation partner, the second area corresponding to a position of the other one of the user and the conversation partner.

13. A non-transitory computer-readable recording medium having a program stored thereon for causing a speech translation apparatus to execute a speech translation method, the speech translation apparatus including a translation start button which instructs start of translation when operated by one of a user of the speech translation apparatus and a conversation partner of the user, the speech translation method including:
estimating a sound source direction by processing an acoustic signal obtained by a microphone array unit;
(i) identifying that an utterer who utters speech is one of the user and the conversation partner of the user, from (a) the sound source direction estimated by the sound source direction estimator after the start of the translation is instructed by the translation start button and (b) a positional relationship indicated by a layout information item selected in advance from a plurality of layout information items that are stored in storage and respectively indicate different positional relationships between the user, the conversation partner, and a display with respect to the speech translation apparatus, and (ii) determining a translation direction indicating an input language in which content of the acoustic signal is recognized and an output language into which the content of the acoustic signal is translated, the input language being one of a first language used by the user and predetermined and a second language used by the conversation partner and predetermined and the output language being the other one of the first language and the second language, the second language being different from the first language;
obtaining, according to the translation direction determined in the determining, (i) original text indicating the content of the acoustic signal obtained by causing a recognition processor to recognize the acoustic signal in the input language and (ii) translated text indicating the content of the acoustic signal obtained by causing a translation processor to translate the original text into the output language; and
displaying the original text on a first area of the display, and simultaneously displays the translated text on a second area of the display, the first area corresponding to a position of the identified one of the user and the conversation partner, the second area corresponding to a position of the other one of the user and the conversation partner.

\* \* \* \* \*